(12) United States Patent
Yoshida

(10) Patent No.: US 9,309,384 B2
(45) Date of Patent: Apr. 12, 2016

(54) POLYETHYLENE RESIN FOAMED PARTICLES, POLYETHYLENE RESIN IN-MOLD FOAM MOLDED ARTICLE, AND METHOD FOR PRODUCING POLYETHYLENE RESIN FOAMED PARTICLES

(75) Inventor: Toru Yoshida, Settsu (JP)

(73) Assignee: KANEKA CORPORATION, Osaka-Shi (JP)

(*) Notice: Subject to any disclaimer, the term of this patent is extended or adjusted under 35 U.S.C. 154(b) by 219 days.

(21) Appl. No.: 14/003,407

(22) PCT Filed: Mar. 2, 2012

(86) PCT No.: PCT/JP2012/055434
§ 371 (c)(1),
(2), (4) Date: Sep. 5, 2013

(87) PCT Pub. No.: WO2012/121163
PCT Pub. Date: Sep. 13, 2012

(65) Prior Publication Data
US 2013/0338246 A1    Dec. 19, 2013

(30) Foreign Application Priority Data
Mar. 8, 2011 (JP) ................. 2011-050856

(51) Int. Cl.
| C08K 13/02 | (2006.01) |
| C08J 9/00 | (2006.01) |
| C08J 9/12 | (2006.01) |
| C08J 9/18 | (2006.01) |
| C08J 9/232 | (2006.01) |

(52) U.S. Cl.
CPC ............ *C08K 13/02* (2013.01); *C08J 9/0004* (2013.01); *C08J 9/0014* (2013.01); *C08J 9/0066* (2013.01); *C08J 9/0095* (2013.01); *C08J 9/122* (2013.01); *C08J 9/18* (2013.01); *C08J 9/232* (2013.01); *C08J 2201/034* (2013.01); *C08J 2203/06* (2013.01); *C08J 2203/14* (2013.01); *C08J 2205/046* (2013.01); *C08J 2205/052* (2013.01); *C08J 2323/08* (2013.01)

(58) Field of Classification Search
CPC ...... C08J 9/0004; C08J 9/0014; C08J 9/0066; C08J 9/0095; C08J 9/122; C08J 9/18; C08J 9/232; C08J 2201/034; C08J 2203/06; C08J 2203/14; C08J 2205/046; C08J 2205/052; C08J 2323/08; C08K 13/02
See application file for complete search history.

(56) References Cited

U.S. PATENT DOCUMENTS

| 5,086,078 | A | 2/1992 | Harclerode et al. |
| 5,110,524 | A | 5/1992 | Harclerode et al. |
| 5,110,836 | A | 5/1992 | Harclerode et al. |
| 5,110,837 | A | 5/1992 | Harclerode et al. |
| 5,114,640 | A | 5/1992 | Harclerode et al. |
| 5,240,657 | A | 8/1993 | Harclerode et al. |
| 6,462,136 | B1 | 10/2002 | Saito et al. |
| 7,335,716 | B1 | 2/2008 | Takahashi et al. |
| 2006/0047079 | A1 | 3/2006 | Takahashi et al. |
| 2006/0047096 | A1 | 3/2006 | Takahashi et al. |
| 2010/0267850 | A1 | 10/2010 | Yoshida et al. |
| 2012/0123006 | A1 | 5/2012 | Yamada et al. |

FOREIGN PATENT DOCUMENTS

| JP | 2-053837 A | 2/1990 |
| JP | 6-025458 A | 2/1994 |
| JP | 8-259724 A | 10/1996 |
| JP | 10-176077 A | 6/1998 |
| JP | 10-202720 A | 8/1998 |
| JP | 10-204203 A | 8/1998 |
| JP | 10-237211 A | 9/1998 |
| JP | 2000-017079 A | 1/2000 |
| JP | 2000-198872 A | 7/2000 |
| JP | 2001-172438 A | 6/2001 |
| WO | WO99/65976 | * 12/1999 |
| WO | WO 00/24822 A1 | 5/2000 |
| WO | WO 00/78828 A1 | 12/2000 |
| WO | WO 2009/075208 A1 | 6/2009 |
| WO | WO 2010/137719 A1 | 12/2010 |

OTHER PUBLICATIONS

International Search Report issued in PCT/JP2012/055434, mailed on Mar. 27, 2012.
Written Opinion issued in PCT/JP2012/055434, mailed on Mar. 27, 2012.
English translation of International Preliminary Report on Patentability and Written Opinion mailed Sep. 19, 2013, in PCT International Application No. PCT/JP2012/055434.
Database WPI, Week 200014, Thomson Scientific, London, GB; AN 2000-156749, XP002726486, & JP 2000-017079 A (JSP Corp) Jan. 18, 2000 *abstract, paragraphs [0006]-[0051], Examples 3, 4.
Extended European Search Report issued Jul. 22, 2014, in European Patent Application No. 12754382.5.

* cited by examiner

*Primary Examiner* — Irina S Zemel
(74) *Attorney, Agent, or Firm* — Birch, Stewart, Kolasch & Birch, LLP

(57) ABSTRACT

Provided are (i) polyethylene resin foamed particles which are obtained by foaming polyethylene resin particles to be foamed having good productivity and a high expansion ratio and which are suppressed in reduction of cell diameters, and (ii) a polyethylene resin in-mold foam molded article obtained from the polyethylene resin foamed particles which has good surface smoothness while being reduced in surface yellowing. The polyethylene resin foamed particles (i) contain, as a base resin, a polyethylene resin composition containing, in an amount of not less than 1000 ppm to not more than 4000 ppm in total, one or more compounds selected from the group consisting of antioxidants, metal stearates, and inorganic substances and (ii) have Z-average molecular weight of not less than $40 \times 10^4$ to not more than $70 \times 10^4$, an average cell diameter of not less than 180 μm to not more than 450 μm, and an open-cell ratio of not more than 12%.

13 Claims, 1 Drawing Sheet

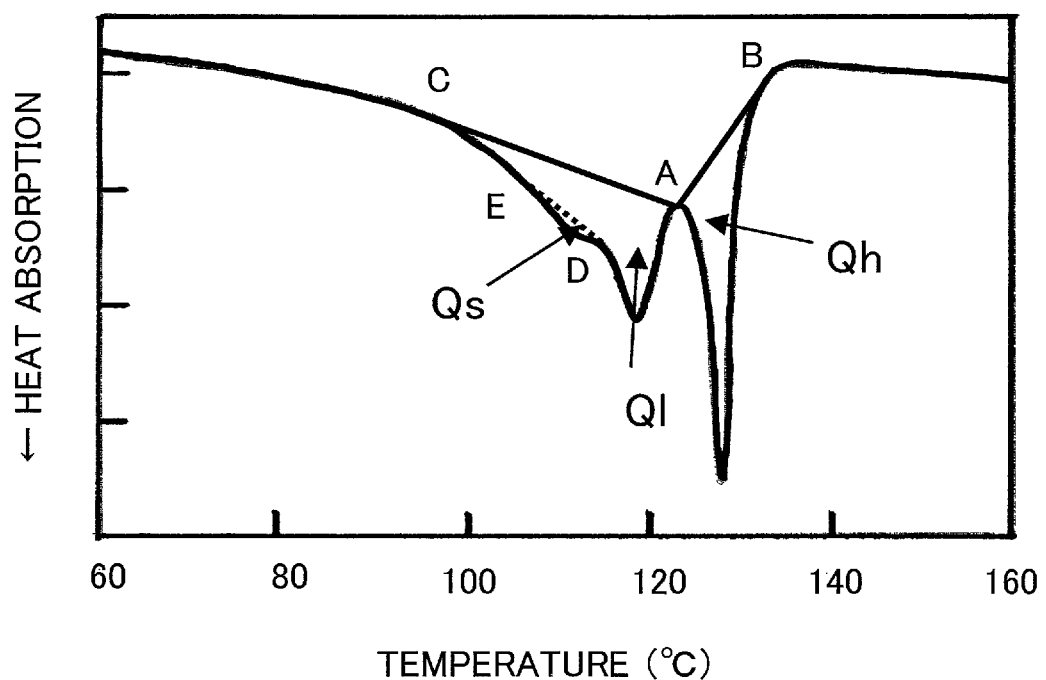

POLYETHYLENE RESIN FOAMED PARTICLES, POLYETHYLENE RESIN IN-MOLD FOAM MOLDED ARTICLE, AND METHOD FOR PRODUCING POLYETHYLENE RESIN FOAMED PARTICLES

TECHNICAL FIELD

The present invention relates to (i) polyethylene resin foamed particles used, for example, for buffer materials, buffer packing materials, returnable boxes, heat-insulating materials, and the like, (ii) a polyethylene resin in-mold foam molded article obtained by in-mold foam molding of the polyethylene resin foamed particles, and (iii) a method for producing the polyethylene resin foamed particles.

BACKGROUND ART

A polyethylene resin in-mold foam molded article, which is obtained by filling a mold with polyethylene resin foamed particles and then heating them with the use of steam, has advantageous features such as freedom in shapes, lightness, and a heat-insulating property.

Various methods for producing polyethylene resin foamed particles are known.

Patent Literature 1 discloses a method for obtaining linear low-density polyethylene resin foamed particles by dispersing linear low-density polyethylene resin particles in an aqueous dispersion medium together with an organic volatile foaming agent, heating and pressurizing the mixture so as to impregnate the linear low-density polyethylene resin particles with the organic volatile foaming agent, and then releasing the linear low-density polyethylene resin particles into a low-pressure zone so as to foam the linear low-density polyethylene resin particles. The organic volatile foaming agent used as a foaming agent in this method is a foaming agent that has high foaming power.

Patent Literature 2 discloses a method for obtaining polyethylene resin foamed particles which (i) have cell diameters of not less than 250 μm, (ii) have two melting peak temperatures (i.e., a melting peak temperature on a low-temperature side and a melting peak temperature on a high-temperature side) in differential scanning calorimetry (DSC) measurement, and (iii) have a melting peak heat quantity on the high-temperature side of 17 J/g to 35 J/g by dispersing polyethylene resin particles in an aqueous dispersion medium together with carbon dioxide (dry ice), heating and pressurizing the mixture so as to impregnate the polyethylene resin particles with carbon dioxide, and then releasing the polyethylene resin particles into a low-pressure zone so as to foam the polyethylene resin particles. Carbon dioxide used as a foaming agent in this method is a foaming agent which is more environmental-compatible than the organic volatile foaming agent but has lower foaming power than the organic volatile foaming agent.

Patent Literature 3 discloses polyethylene resin foamed particles which are obtained by using, as foaming agents, water and carbon dioxide and which contain, as novel hydrophilic compounds, polyethylene glycol and glycerin.

In particular, Patent Literature 1 and Patent Literature 2 describe use of calcium stearate for neutralizing a residue of a catalyst used for polymerization of a polyethylene resin and use of an antioxidant for preventing oxidation degradation of the resin. Patent Literature 1 and Patent Literature 2 describe, as specific examples of the antioxidant, a phenol-based antioxidant (Irganox 1010) and a phosphorus-based antioxidant (Phosphite 168).

However, Patent Literatures 1 and 2 also mention that calcium stearate and the antioxidant act also as a foam nucleating agent, and therefore addition of large amounts of calcium stearate and antioxidant causes obtained foamed particles to have extremely small cell diameters, and thus results in deterioration of surface smoothness etc. of a foam molded article. On this account, Patent Literature 1 states that calcium stearate is preferably added in an amount of 20 ppm to 300 ppm. Examples of Patent Literature 1 use a polyethylene resin containing 170 ppm of calcium stearate, 250 ppm of Irganox 1010, and 750 ppm of Phosphite 168 (1170 ppm in total (a sum of Irganox 1010 and Phosphite 168 is 1000 ppm)). Patent Literature 2 states that calcium stearate or the like is preferably added in an amount of not more than 1500 ppm, especially not more than 900 ppm. Examples of Patent Literature 2 use a polyethylene resin containing 700 ppm of calcium stearate, 300 ppm of the phenol-based antioxidant, and 500 ppm of the phosphorus-based antioxidant (1500 ppm in total (a sum of the phenol-based antioxidant and the phosphorus-based antioxidant is 800 ppm)).

Patent Literature 2 states that, in an extrusion step of obtaining resin particles which is followed by a step of obtaining foamed particles, there occurs a change in melt index and melt tension in accordance with a pelletizing temperature condition etc., and that, especially in a case where a resin temperature exceeds 250° C., there occurs a resin degradation such as decomposition and cross-linking of a polyethylene resin, which results in a decline in melt index and an increase in melt tension, thereby making it impossible to obtain foamed particles with a high expansion ratio. In order to prevent such inconvenience, Patent Literature 2 describes a method for obtaining resin particles through pelletization at a resin temperature of not more than 250° C.

However, in such a case where resin particles are obtained through pelletization at a resin temperature of not more than 250° C. in the extrusion step, the polyethylene resin has a high melt viscosity, which causes a large load to be applied to an extruder. This undesirably makes it necessary to restrict a production amount of resin particles per unit time at a low level.

In a case where resin particles are produced at a resin temperature of higher than 250° C. in order to increase a production amount of resin particles per unit time, there occur a decline in melt index and an increase in melt tension as described above, which make it impossible to obtain foamed particles with a high expansion ratio. Meanwhile, in a case where a large amount of antioxidant is added in order to avoid such inconvenience, foamed particles obtained by foaming resin particles have extremely small cell diameters. As a result, there remains a problem of a deterioration of surface smoothness etc. of a polyethylene resin in-mold foam molded article.

Patent Literature 4 and Patent Literature 5 describe polyethylene resin foamed particles with a large amount of additive. Specifically, Patent Literature 4 and Patent Literature 5 describe polyethylene resin foamed particles with 0.12 parts by weight (1200 ppm) of talc which is an inorganic substance. However, since an average cell diameter of these polyethylene resin foamed particles is less than 180 μm, there remains a problem that it is difficult to obtain a polyethylene resin in-mold foam molded article having a good surface property from such polyethylene resin foamed particles.

Although Patent Literature 4 and Patent Literature 5 describe an example of polyethylene resin foamed particles that have an average cell diameter of 180 μm or larger as well, these polyethylene resin foamed particles have an open-cell ratio of 30% or more. Accordingly, a polyethylene resin in-mold foam molded article obtained from such polyethylene resin foamed particles cannot have a good surface property due to a large shrinkage etc. Moreover, there occurs a great decline in compressive strength. For these reasons, the polyethylene resin in-mold foam molded article is not practical.

Note that the average cell diameters in Patent Literature 4 and Patent Literature 5 are ones obtained in accordance with ASTM D 3576. That is, these average cell diameters are values obtained as "L/n/0.616" where L is a certain length and n is the number of cells present in the certain length L. It should therefore be noted that these average cell diameters are values each obtained by multiplying a value obtained merely as "L/n" by 1.623 (dividing a value obtained as "L/n" by 0.616).

In addition, there is another problem that a polyethylene resin in-mold foam molded article obtained from conventional polyethylene resin foamed particles undergoes surface yellowing in an in-mold foam molding step, and this surface yellowing reduces a commercial value of the polyethylene resin in-mold foam molded article. Such surface yellowing is considered to be caused by a phenol-based antioxidant added as an antioxidant. Patent Literature 6 and Patent Literature 7 describe using a phosphorus-based antioxidant in combination with the phenol-based antioxidant in order to prevent such yellowing. However, the techniques disclosed in Patent Literature 6 and Patent Literature 7 are not ones related to a resin foam molded article. Therefore, mere application of these techniques to polyethylene resin foamed particles causes problems such as extremely small cell diameters of the polyethylene resin foamed particles as described above.

Meanwhile, Patent Literature 6 and Patent Literature 7 do not disclose a technique mentioning Z-average molecular weight (Mz) of a polyethylene resin used for polyethylene resin foamed particles.

Patent Literature 8 describes a foam molded article made of an ethylene (co)polymer having a particular molecular weight distribution (Mw/Mn). However, the ethylene (co) polymer disclosed in Examples of Patent Literature 8 is one that has a large molecular weight (Z-average molecular weight (Mz) of not less than $82 \times 10^4$) and that is not related to a foam molded article.

Patent Literature 9 describes a foam molded article made of an ethylene copolymer having a particular molecular weight distribution (Mz/Mw), but has no specific description about Z-average molecular weight (Mz). Moreover, the foam molded article described in Patent Literature 9 is a foam molded article obtained by kneading a mixture of an ethylene copolymer and a foaming agent and then foaming it through extrusion, foaming it in an oven, or foaming it through pressing. That is, Patent Literature 9 does not describe a foamed particle obtained by foaming resin particles after impregnating them with a foaming agent. Since such different foaming methods use base resins that are utterly different in resin properties, it is difficult to apply the technique described in Patent Literature 9 to the art of foamed particles.

Patent Literature 10 describes a cross-linked foam molded article containing an ethylene copolymer having a particular molecular weight distribution (Mz/Mw), but has no specific description about Z-average molecular weight (Mz). Moreover, the foam molded article described in Patent Literature 10 is a foam molded article obtained by injection foaming or press foaming and by cross-linking. That is, Patent Literature 10 does not describe a foamed particle obtained by foaming after impregnating resin particles with a foaming agent. Since such different foaming methods use base resins that are utterly different in resin properties, it is difficult to apply the technique described in Patent Literature 10 to the art of foamed particles.

Meanwhile, Patent Literatures 11 through 13 describe Z-average molecular weight of a base resin for use in polypropylene resin foamed particles or polystyrene resin foamed particles although Patent Literatures 11 through 13 have no mention of polyethylene resin foamed particles.

However, a polypropylene resin and a polystyrene resin are utterly different from a polyethylene resin in melt characteristics such as a resin melting point and a melt index, a crystalline structure, foaming conditions such as foaming temperature, and the like. It is therefore difficult to directly apply Z-average molecular weight of a polypropylene resin or a polystyrene resin to Z-average molecular weight of a polyethylene resin.

CITATION LIST

Patent Literatures

Patent Literature 1
Japanese Patent Application Publication, Tokukaihei, No. 2-53837 A (Publication Date: Feb. 22, 1990)
Patent Literature 2
Japanese Patent Application Publication, Tokukai, No. 2000-17079 A (Publication Date: Jan. 18, 2000)
Patent Literature 3
WO2009/075208 (Publication Date: Jun. 18, 2009)
Patent Literature 4
Japanese Patent Application Publication, Tokukaihei, No. 10-204203 A (Publication Date: Aug. 4, 1998)
Patent Literature 5
Japanese Patent Application Publication, Tokukaihei, No. 10-237211 A (Publication Date: Sep. 8, 1998)
Patent Literature 6
Japanese Patent Application Publication, Tokukaihei, No. 10-202720 A (Publication Date: Aug. 4, 1998)
Patent Literature 7
Japanese Patent Application Publication, Tokukai, No. 2001-172438 A (Publication Date: Jun. 26, 2001)
Patent Literature 8
WO2000/078828 (Publication Date: Dec. 28, 2000)
Patent Literature 9
WO2000/024822 (Publication Date: May 4, 2000)
Patent Literature 10
WO2010/137719 (Publication Date: Dec. 2, 2010)
Patent Literature 11
Japanese Patent Application Publication, Tokukai, No. 2000-198872 A (Publication Date: Jul. 18, 2000)
Patent Literature 12
Japanese Patent Application Publication, Tokukaihei, No. 8-259724 A (Publication Date: Oct. 8, 1996)
Patent Literature 13
Japanese Patent Application Publication, Tokukaihei, No. 6-25458 A (Publication Date: Feb. 1, 1994)

SUMMARY OF INVENTION

Technical Problem

The present invention was accomplished in view of the above problems, and a main object of the present invention is to provide polyethylene resin foamed particles which (i) are obtained by foaming polyethylene resin particles to be foamed that have good productivity and can be foamed at a high expansion ratio and (ii) are suppressed in reduction of cell diameters and in resin degradation, even in a case where a relatively large amount of additive (not less than 1000 ppm to not more than 4000 ppm) is added.

Another object of the present invention is to provide a polyethylene resin in-mold foam molded article which is obtained from the polyethylene resin foamed particles and which has good surface smoothness while being reduced in surface yellowing which occurs during in-mold foam molding.

Solution to Problem

As a result of diligent studies, the inventors of the present invention found that the above problems can be solved by polyethylene resin foamed particles (i) whose base resin is a polyethylene resin composition containing, in an amount of not less than 1000 ppm to not more than 4000 ppm in total, one or more compounds selected from the group consisting of antioxidants, metal stearates, and inorganic substances, and (ii) which have Z-average molecular weight of not less than $40 \times 10^4$ to not more than $70 \times 10^4$, an average cell diameter of not less than 180 µm to not more than 450 µm, and an open-cell ratio of not more than 12%. Based on this finding, the inventors of the present invention accomplished the present invention.

That is, the present invention is as follows.

[1] Polyethylene resin foamed particles comprising, as a base resin, a polyethylene resin composition which contains, in an amount of not less than 1000 ppm to not more than 4000 ppm in total, one or more compounds selected from the group consisting of antioxidants, metal stearates, and inorganic substances, the polyethylene resin foamed particles having a Z-average molecular weight of not less than $40 \times 10^4$ to not more than $70 \times 10^4$, an average cell diameter of not less than 180 µm to not more than 450 µm, and an open-cell ratio of not more than 12%.

[2] The polyethylene resin foamed particles according to [1], wherein the Z-average molecular weight is not less than $45 \times 10^4$ to not more than $60 \times 10^4$.

[3] The polyethylene resin foamed particles according to [1] or [2], wherein the polyethylene resin composition contains the one or more compounds in an amount of not less than 1600 ppm to not more than 3700 ppm in total.

[4] The polyethylene resin foamed particles according to any one of [1] through [3], wherein: the polyethylene resin composition contains antioxidants, which include a phosphorus-based antioxidant and a phenol-based antioxidant; and the following conditions (a1) and (a2) are satisfied:

(a1) an amount of the phosphorus-based antioxidant contained in the polyethylene resin composition is not less than 500 ppm to not more than 1500 ppm, and (a2) a ratio of the amount of the phosphorus-based antioxidant to an amount of the phenol-based antioxidant in the polyethylene resin composition (the amount of the phosphorus-based antioxidant/the amount of the phenol-based antioxidant) is not less than 2.0 to not more than 7.5.

[5] The polyethylene resin foamed particles according to [4], wherein the ratio is not less than 2.5 to not more than 5.0.

[6] The polyethylene resin foamed particles according to any one of [1] through [5], wherein a total amount of the phosphorus-based antioxidant and the phenol-based antioxidant contained in the polyethylene resin composition is not less than 800 ppm to not more than 1900 ppm in total.

[7] The polyethylene resin foamed particles according to any one of [1] through [6], wherein the polyethylene resin composition contains a metal stearate in an amount of not less than 200 ppm to not more than 700 ppm.

[8] The polyethylene resin foamed particles according to any one of [1] through [7], wherein the polyethylene resin composition contains an inorganic substance in an amount of not less than 300 ppm to not more than 2500 ppm.

[9] The polyethylene resin foamed particles according to any one of [1] through [8], wherein the average cell diameter is not less than 200 µm to not more than 400 µm.

[10] The polyethylene resin foamed particles according to any one of [1] through [9], wherein a polyethylene resin in the polyethylene resin composition contains at least a linear low-density polyethylene resin.

[11] A polyethylene resin in-mold foam molded article produced by in-mold foam molding of polyethylene resin foamed particles as set forth in any one of [1] through [10].

[12] A method for producing polyethylene resin foamed particles which have a Z-average molecular weight of not less than $40 \times 10^4$ to not more than $70 \times 10^4$, an average cell diameter of not less than 180 µm to not more than 450 µm, and an open-cell ratio of not more than 12%, the method comprising the first-stage foaming step of (i) dispersing polyethylene resin particles to be foamed in an aqueous dispersion medium in a closed vessel together with a foaming agent, the polyethylene resin particles to be foamed including a polyethylene resin composition which contains, in an amount of not less than 1000 ppm to not more than 4000 ppm in total, one or more compounds selected from the group consisting of antioxidants, metal stearates, and inorganic substances, (ii) pressurizing and heating up to or above a softening temperature of the polyethylene resin particles to be foamed, and then (iii) releasing the polyethylene resin particles to be foamed into a zone whose pressure is lower than an internal pressure of the closed vessel.

[13] A method for producing polyethylene resin foamed particles which have a Z-average molecular weight of not less than $40 \times 10^4$ to not more than $70 \times 10^4$, an average cell diameter of not less than 180 µm to not more than 450 µm, and an open-cell ratio of not more than 12%, the method comprising:

the first-stage foaming step of (i) dispersing polyethylene resin particles to be foamed in an aqueous dispersion medium in a closed vessel together with carbon dioxide, the polyethylene resin particles to be foamed including a polyethylene resin composition which contains, in an amount of not less than 1000 ppm to not more than 4000 ppm in total, one or more compounds selected from the group consisting of antioxidants, metal stearates, and inorganic substances, (ii) pressurizing and heating up to or above a softening temperature of the polyethylene resin particles to be foamed, and then (ii) releasing the polyethylene resin particles to be foamed into a zone whose pressure is lower than an internal pressure of the closed vessel so as to obtain polyethylene resin foamed particles; and the second-stage foaming step of (i) putting the polyethylene resin foamed particles obtained in the first-stage foaming step into a pressure-resistant vessel, (ii) impregnating the polyethylene resin foamed particles with an inorganic gas containing at least one type of gas selected from the group consisting of air, nitrogen, and carbon dioxide to impart an internal pressure to the polyethylene resin foamed particles, and then (iii) further foaming the polyethylene resin foamed particles through heating.

[14] The method according to [12] or [13], wherein:
the polyethylene resin composition contains antioxidants, which include a phosphorus-based antioxidant and a phenol-based antioxidant; and the following conditions (a1) and (a2) are satisfied:

(a1) an amount of the phosphorus-based antioxidant contained in the polyethylene resin composition is not less than 500 ppm to not more than 1500 ppm, and (a2) a ratio of the amount of the phosphorus-based antioxidant to an amount of the phenol-based antioxidant in the polyethylene resin composition (the amount of the phosphorus-based antioxidant/the amount of the phenol-based antioxidant) is not less than 2.0 to not more than 7.5.

[15] The method according to any one of [12] through [14], wherein the polyethylene resin particles to be foamed are obtained through melting and kneading in an extruder at a resin temperature ranging from not less than 250° C. to not more than 320° C.

Advantageous Effects of Invention

According to the polyethylene resin foamed particles of the present invention, it is possible to provide polyethylene resin foamed particles which (i) are obtained by foaming polyethylene resin particles to be foamed that have good productivity and can be foamed at a high expansion ratio, and (ii) are suppressed in reduction of cell diameters and in resin degradation, even in a case where a polyethylene resin composition serving as a base resin contains a relatively large amount (not less than 1000 ppm to not more than 4000 ppm in total) of one or more compounds selected from the group consisting of antioxidants, metal stearates, and inorganic substances.

In particular, according to the present invention, in a case where a particular amount of antioxidant is added, the effect of suppressing resin degradation of the polyethylene resin composition is high. It is therefore possible to produce good polyethylene resin particles to be foamed that are suppressed in resin degradation such as decomposition and cross-linking even at a high resin temperature of 250° C. or higher in an extrusion step for producing polyethylene resin particles to be foamed. Since the extrusion can be carried out at a high resin temperature of 250° C. or higher, it is possible to reduce a load applied to an extruder and to improve productivity (discharge amount).

Further, a polyethylene resin in-mold foam molded article obtained by in-mold foam molding of the polyethylene resin foamed particles is reduced in surface yellowing which can occur during the in-mold foam molding and is excellent in surface smoothness. It is therefore possible to provide a polyethylene resin in-mold foam molded article which is reduced in surface yellowing which can occur during the in-mold foam molding and is good in surface smoothness.

According to the method of the present invention for producing polyethylene resin foamed particles, it is possible to produce polyethylene resin foamed particles that are suppressed in reduction of cell diameters and resin degradation even in a case where (i) carbon dioxide which is a foaming agent with relatively weak foaming power is used and (ii) relatively large amounts of phosphorus-based antioxidant and phenol-based antioxidant are contained. Further, the polyethylene resin foamed particles thus obtained can have a high expansion ratio.

BRIEF DESCRIPTION OF DRAWINGS

FIG. 1 is a graph showing an example of a DSC curve obtained by differential scanning calorimetry (DSC) measurement of polyethylene resin foamed particles of the present embodiment. The polyethylene resin foamed particles have two melting peak temperatures, i.e., a low-temperature side melting peak temperature and a high-temperature side melting peak temperature.

DESCRIPTION OF EMBODIMENTS

Polyethylene resin foamed particles of the present invention are polyethylene resin foamed particles (i) whose base resin is a polyethylene resin composition containing, in an amount of not less than 1000 ppm to not more than 4000 ppm in total, one or more compounds selected from the group consisting of antioxidants, metal stearates, and inorganic substances, and (ii) which have Z-average molecular weight (hereinafter sometimes referred to as "Mz") of not less than $40 \times 10^4$ to not more than $70 \times 10^4$, an average cell diameter of not less than 180 μm to not more than 450 μm, and an open-cell ratio of not more than 12%.

An embodiment of the present invention is described below. Note, however, that the present invention is not limited to this, but may be altered in various ways within the scope of the description.

The polyethylene resin foamed particles of the present invention uses, as a base resin, a polyethylene resin composition containing, in an amount of not less than 1000 ppm to not more than 4000 ppm in total, one or more compounds selected from the group consisting of antioxidants, metal stearates, and inorganic substances.

The antioxidant is used for the purpose of suppressing degradation of the polyethylene resin composition during processing of the polyethylene resin composition. In a case where an amount of addition of a phosphorus-based antioxidant is increased, it is possible to further suppress surface yellowing of the molded article during in-mold foam molding.

The metal stearate is, for example, used for the purpose of neutralizing a residue of a catalyst used for polymerization of a polyethylene resin. The metal stearate has functions of suppressing resin degradation and corrosion of an extruder and a molding machine to which the polyethylene resin composition is supplied.

The inorganic substance is used for the purpose of improving an expansion ratio of the polyethylene resin foamed particles and uniforming cell diameters.

According to the present invention, it is only necessary that one or more compounds selected from the group consisting of antioxidants, metal stearates, and inorganic substances be used. However, in order to accomplish all of the above purposes, it is preferable that the polyethylene resin composition contain all of an antioxidant, a metal stearate, and an inorganic substance.

According to the present invention, the polyethylene resin composition is required to contain, in an amount of not less than 1000 ppm in total, one or more compounds selected from the group consisting of antioxidants, metal stearates, and inorganic substances. If the total amount of the one or more compounds contained in the polyethylene resin composition is less than 1000 ppm, it tends to become impossible to accomplish the above purposes.

Meanwhile, antioxidants, metal stearates, and inorganic substances are in general likely to act as foam nucleating agents during foaming, and therefore encourage the polyethylene resin foamed particles to have extremely small cell diameters. Especially if the total amount of the one or more compounds contained in the polyethylene resin composition is more than 4000 ppm, the polyethylene resin foamed particles tend to have extremely small cell diameters, and as a result, a polyethylene resin in-mold foam molded article obtained from the polyethylene resin foamed particles tends to have a less smooth surface.

For these reasons, the total amount of the one or more compounds contained in the polyethylene resin composition is preferably in a range from not less than 1000 ppm to not more than 4000 ppm, more preferably in a range from not less than 1100 ppm to not more than 3900 ppm, even more preferably in a range from not less than 1600 ppm to not more than 3700 ppm.

According to the present invention, Mz of the polyethylene resin foamed particles is not less than $40 \times 10^4$ to not more than $70 \times 10^4$. This makes it possible to inhibit the polyethylene resin foamed particles from having extremely small cell diameters even in a case where the antioxidant(s), the metal stearate(s), and the inorganic substance(s) encourage the polyethylene resin foamed particles to have extremely small cell diameters.

That is, according to the present invention, it is preferable that (i) the total amount of the one or more compounds contained in the polyethylene resin composition be not less than 1000 ppm to not more than 4000 ppm and (ii) Mz of the polyethylene resin foamed particles be not less than $40 \times 10^4$ to not more than $70 \times 10^4$, more preferably not less than $45 \times 10^4$ to not more than $60 \times 10^4$, even more preferably not less than $47 \times 10^4$ to not more than $55 \times 10^4$.

If Mz of the polyethylene resin foamed particles is more than $70 \times 10^4$, the polyethylene resin foamed particles tend to have extremely small cell diameters, and as a result, a polyethylene resin in-mold foam molded article obtained from the polyethylene resin foamed particles tends to have a less smooth surface. Moreover, if Mz of the polyethylene resin foamed particles is more than $70 \times 10^4$, it tends to be difficult to foam the polyethylene resin foamed particles at a high expansion ratio.

If Mz of the polyethylene resin foamed particles is less than $40 \times 10^4$, the polyethylene resin foamed particles tend to have a higher open-cell ratio, and a polyethylene resin in-mold foam molded article obtained by in-mold foam molding of the polyethylene resin foamed particles tends to have a reduced compressive stress.

Note that relevance between cell diameters and Mz and a mechanism of how cell diameters vary depending on Mz have not been clarified yet. However, there is a possibility that a high-molecular-weight component of a polyethylene resin is deeply involved as a factor for promoting or inhibiting enlargement of cells. If Mz, which is average molecular weight in which a rate of contribution by a high-molecular-weight component is high, is larger than $70 \times 10^4$, cell diameters tend to become extremely small. It is speculated that this tendency has something to do with the mechanism of how cell diameters vary depending on Mz.

Mz of a polyethylene resin which is a raw material that constitutes the polyethylene resin composition used in the present invention or Mz of polyethylene resin particles to be foamed (The "polyethylene resin particles to be foamed" refer to polyethylene resin particles that have not been foamed yet (have not been turned into the polyethylene resin foamed particles yet). Details of the "polyethylene resin particles to be foamed" will be described later.) is not limited in particular. It is, however, preferable that Mz of the polyethylene resin or Mz of the polyethylene resin particles to be foamed be approximately not less than $40 \times 10^4$ to not more than $70 \times 10^4$ in order that Mz of the polyethylene resin foamed particles be not less than $40 \times 10^4$ to not more than $70 \times 10^4$.

However, in a case where the polyethylene resin particles to be foamed are produced by an extrusion step using an extruder, the extrusion step tends to slightly increase molecular weight of the polyethylene resin. In view of this, it is more preferable to use, as a base resin, a polyethylene resin having Mz slightly lower (lower by approximately $1 \times 10^4$ to $2 \times 10^4$) than (i) desired Mz of the polyethylene resin particles to be foamed or (ii) desired Mz of the polyethylene resin foamed particles.

Note that Mz of the polyethylene resin particles to be foamed and Mz of the polyethylene resin foamed particles substantially coincide with each other. That is, almost no change in molecular weight is observed in a step of turning the polyethylene resin particles to be foamed into the polyethylene resin foamed particles. Such polyethylene resins with various values of Mz are available from manufacturers of polyethylene resins. For example, Japanese Patent Application Publication, Tokukai, No. 2009-173798A, Japanese Patent Application Publication, Tokukai, No. 2009-197226A, or Japanese Patent Application Publication, Tokukai, No. 2011-099092A disclose polyethylene resins having various values of Mz. By making inquiries to manufacturers of polyethylene resins on the basis of such information, it is possible to get such polyethylene resins as commercialized products or prototypes.

Examples of the polyethylene resin serving as the base resin in the present invention encompass high-density polyethylene resins, medium-density polyethylene resins, low-density polyethylene resins, and linear low-density polyethylene resins. Above all, a linear low-density polyethylene resin is more preferably used since polyethylene resin foamed particles with a high expansion ratio can be obtained from the linear low-density polyethylene resin.

It is also possible to use in combination plural types of linear low-density polyethylene resins having different densities.

Moreover, it is also possible to use in combination (i) a linear low-density polyethylene resin and (ii) at least one type of resin selected from the group consisting of high-density polyethylene resins, medium-density polyethylene resins, and low-density polyethylene resins.

Use of plural types of polyethylene resins in combination makes it easy to expand an allowable pressure range in in-mold foam molding, and is therefore a more preferable aspect of the present invention. Especially, it is more preferable to use a linear low-density polyethylene resin and a low-density polyethylene resin in combination.

It is more preferable that the linear low-density polyethylene resin used in the present invention have, for example, a melting point of not less than 115° C. to not more than 130° C., a density of not less than 0.915 g/cm$^3$ to not more than 0.940 g/cm$^3$, and a melt index of not less than 0.1 g/10 minutes to not more than 5 g/10 minutes.

Note that the "melt index" in the present invention refers to a value measured in accordance with JIS K7210 at a temperature of 190° C. and a load of 2.16 kg.

The linear low-density polyethylene resin used in the present invention may include a comonomer, other than ethylene, which can copolymerize with ethylene.

The comonomer which can copolymerize with ethylene can be α-olefin having a carbon number of not less than C4 to not more than C18. Examples of the comonomer which can copolymerize with ethylene encompass 1-butene, 1-pentene, 1-hexene, 3,3-dimethyl-1-butene, 4-methyl-1-pentene, 4,4-dimethyl-1-pentene, and 1-octene. These comonomers may be used alone or in combination of two or more of them.

In a case where the linear low-density polyethylene resin is a copolymer, it is preferable to perform polymerization by using a comonomer in a range of approximately not less than 1% by weight to not more than 12% by weight in order that the density of the copolymer falls in the above range.

It is more preferable that the low-density polyethylene resin used in the present invention have, for example, a melting point of not less than 100° C. to not more than 120° C., a density of not less than 0.910 g/cm$^3$ to not more than 0.930 g/cm$^3$, and a melt index of not less than 0.1 g/10 minutes to not more than 100 g/10 minutes.

Note that the "melt index" in the present invention refers to a value measured in accordance with JIS K7210 at a temperature of 190° C. and a load of 2.16 kg.

The low-density polyethylene resin used in the present invention may include a comonomer, other than ethylene, which can copolymerize with ethylene. The comonomer which can copolymerize with ethylene can be α-olefin having a carbon number of not less than C4 to not more than C18. Examples of the comonomer which can copolymerize with ethylene encompass 1-butene, 1-pentene, 1-hexene, 3,3-dimethyl-1-butene, 4-methyl-1-pentene, 4,4-dimethyl-1-pentene, and 1-octene. These comonomers may be used alone or in combination of two or more of them.

The polyethylene resin foamed particles in the present invention are obtained by foaming the polyethylene resin particles to be foamed. The polyethylene resin particles to be foamed are obtained by (i) preparing a polyethylene resin composition containing, in an amount of not less than 1000 ppm to not more than 4000 ppm in total, one or more compounds selected from the group consisting of antioxidants, metal stearates, and inorganic substances, (ii) supplying it to an extruder, (iii) melting and kneading it, (iv) extruding it in a strand, and then (v) cutting it into particles.

In such a case where the polyethylene resin particles to be foamed are produced by an extrusion step using an extruder and where the extrusion is carried out at a high resin temperature of 250° C. or higher in order to increase productivity (discharge rate) per unit time, it is preferable to add an increased amount of antioxidant from the perspective of suppression of resin degradation such as decomposition or cross-linking of the polyethylene resin. From the perspective of suppression of yellowing of the polyethylene resin in-mold foam molded article, it is preferable to add an increased amount of phosphorus-based antioxidant.

In a case where an increased amount of antioxidant is used in the present invention, it is preferable to use, as the antioxidant, a phosphorus-based antioxidant and a phenol-based antioxidant in combination.

It is more preferable that the phosphorus-based antioxidant is contained in the polyethylene resin composition in an amount of not less than 500 ppm to not more than 1500 ppm, even more preferably in an amount of not less than 600 ppm to not more than 1400 ppm, especially preferably in an amount of not less than 800 ppm to not more than 1200 ppm.

If the phosphorus-based antioxidant is contained in an amount of less than 500 ppm, resin degradation tends to occur in the extrusion step for obtaining the polyethylene resin particles to be foamed. Especially, in a case where the resin temperature is 250° C. or higher, the resin degradation tends to be remarkable. This necessitates the resin temperature to be lower than 250° C., and therefore tends to decrease productivity of the polyethylene resin particles to be foamed.

In addition, if the phosphorus-based antioxidant is contained in an amount of less than 500 ppm, it tends to be difficult to suppress yellowing of the polyethylene resin in-mold foam molded article obtained by in-mold foam molding.

Meanwhile, if the phosphorus-based antioxidant is contained in an amount of more than 1500 ppm, the polyethylene resin foamed particles have remarkable tendency to have extremely small cell diameters. Such extremely small cell diameters tend to make the surface of the polyethylene resin in-mold foam molded article less smooth.

In the present invention, in a case where a phosphorus-based antioxidant and a phenol-based antioxidant are used in combination as the antioxidant, it is more preferable that a ratio of an amount of the phosphorus-based antioxidant to an amount of the phenol-based antioxidant in the polyethylene resin composition (the amount of the phosphorus-based antioxidant/the amount of the phenol-based antioxidant; hereinafter sometimes referred to simply as "antioxidant ratio") be not less than 2.0 to not more than 7.5, even more preferably not less than 2.5 to not more than 5.0. If the antioxidant ratio is less than 2.0, it tends to be difficult to suppress yellowing of the polyethylene resin in-mold foam molded article obtained by in-mold foam molding. It is not clear why the yellowing occurs, but it is speculated that the yellowing occurs because the phenol-based antioxidant changes its structure and exhibits a color due to pressurized steam used for the in-mold foam molding. From the perspective of suppression of yellowing, it is more preferable that the antioxidant ratio be not less than 2.0.

Meanwhile, if the antioxidant ratio is more than 7.5, the polyethylene resin foamed particles have remarkable tendency to have extremely small cell diameters, and the polyethylene resin in-mold foam molded article tends to have a less smooth surface.

In a case where a phosphorus-based antioxidant and a phenol-based antioxidant are used in combination, it is more preferable that an amount of the phenol-based antioxidant be derived from the above-mentioned amount of the phosphorus-based antioxidant and the above-mentioned antioxidant ratio. Specifically, in a case where the polyethylene resin particles to be foamed are obtained in the extrusion step, it is more preferable that the amount of the phenol-based antioxidant contained in the polyethylene resin composition be not less than 200 ppm to not more than 500 ppm from the perspective of suppression of resin degradation and from the perspective of suppression of yellowing of the polyethylene resin in-mold foam molded article.

If the amount of the phenol-based antioxidant is less than 200 ppm, resin degradation tends to occur in the extrusion step for obtaining the polyethylene resin particles to be foamed. Meanwhile, if the amount of the phenol-based antioxidant is more than 500 ppm, the polyethylene resin foamed particles have a remarkable tendency to have extremely small cell diameters, and it tends to be difficult to suppress yellowing of the polyethylene resin in-mold foam molded article obtained by in-mold foam molding.

It is more preferable that the total amount of the phosphorus-based antioxidant and the phenol-based antioxidant in the polyethylene resin composition be not less than 800 ppm to not more than 1900 ppm from the perspective of suppression of the resin degradation and yellowing.

The phosphorus-based antioxidant and the phenol-based antioxidant used in the present invention are not limited to specific types, and can be generally known ones.

Examples of the phosphorus-based antioxidant used in the present invention encompass tris(2,4-di-t-butylphenyl)phosphite [product name: [IRGAFOS168, IRGAFOS168FF], bis(2,4-di-t-butylphenyl)pentaerythritol diphosphite, 2-[[2,4,8,10-tetrakis(1,1-dimethylethyl)dibenzo[d,f][1,3,2]dioxaphosphepin-6-yl]oxy]-N,N-bis[2-[[2,4,8,10-tetrakis(1,1-dimethylethyl)dibenzo[d,f][1,3,2]dioxaphosphepin-6-yl]oxy]-ethyl]ethanamine, 3,5-di-t-butyl-4-hydroxybenzyl phosphite diethyl ester, bis(2,6-di-t-butyl-4-methyl phenoxy)

diphospospiroundecane, bis(stearyl)diphosphospiroundecane, cyclic nenopentane-tetra-yl-bis(nonylphenyl phosphite), bis(nonylphenylphenoxy)diphosphospiroundecane, 3,4,5,6-dibenzo-1,2-oxaphosphane-2-oxide, 2,4,6-tri-t-butylphenyl-2-butyl-2-ethyl-1,3-propanediolphosphite, 2,2'-methylenebis(4,6-di-t-butylphenyl)octylphosphite, bis[2,4-bis(1,1-dimethylethyl)-6-methylphenyl]ethylphosphite, bis(2,4-di-t-butylphenoxy)diphosphospiroundecane, trilauryl trithiophosphite, 1,1,3-tris(2-methyl-4-di-tridecylphosphite-5-t-butylphenyl) butane, 2,2'-ethylidenebis(4,6-di-t-butylphenyl)fluorophosphite, 4,4'-isopropylidenediphenol alkyl(C12-C15)phosphite, 4,4'-butylidenebis(3-methyl-6-t-butylphenyl)-di-tridecylphosphite, diphenylisodecyl phosphite, diphenylmono(tridecyl)phosphite, tris-(mono-& di-mixed nonylphenyl)phosphite, phenyl-bisphenol A pentaerythritol diphosphite, di(laurylthio)pentaerythritol diphosphite, tetrakis(2,6-di-t-butyl-4-n-octadecyloxycarbonylethyl-phenyl)-4,4'-biphenylene-di-phosphonite, tetrakis[2,6-di-t-butyl-4-(2,4'-di-t-butylphenyloxycarbonyl)-phenyl]-4,4'-biphenylene-di-phosphonite, tricetyl trithiophosphite, condensate of di-t-butylphenyl-m-cresylphosphonite and biphenyl, cyclic butylethylpropanediol-2,4,6-tri-butylphenyl phosphite, tris-[2-(2,4,8,10-tetrabutyl-5,7-dioxa-6-phospho-dibenzo-[a,c]cyclohepten-6-yl-oxy)ethyl]amine, bis(3,5-di-t-butyl-4-hydroxybenzyl ethylphosphonate) calcium, and 3,9-bis[2,4-bis(1-methyl-1-phenylethyl)phenoxy]-2,4,8,10-tetraoxa-3,9-diphosphaspiro[5,5]undecane. These phosphorus-based antioxidants may be used alone or in combination of two or more of them.

Note that product names of these phosphorus-based antioxidants are, for example, IRGAFOS168, IRGAFOS168FF, IRGAFOS12, IRGAFOS38, Ultranox626, and PEP24G.

Of these phosphorus-based antioxidants, tris(2,4-di-t-butylphenyl))phosphite [product name: IRGAFOS168] is especially preferable from the perspective of suppression of resin degradation in a case where the polyethylene resin particles to be foamed are obtained in the extrusion step and from the perspective of suppression of yellowing of the polyethylene resin in-mold foam molded article.

Examples of the phenol-based antioxidant used in the present invention encompass triethyleneglycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis(n-octylthio)-6-(4-hydroxy-3,5-di-t-butylanilino)-1,3,5-triazine, pentaerithrityl-tetrakis [3-(3,5-di-t-butyl-4-hydroxyphenyl)propionate], 2,2-thio-diethylenebis[3-(3,5-di-t-butyl-4-hydroxyphenyl)propionate], octadecyl-3-(3,5-di-t-butyl-4-hydroxyphenyl)propionate, N,N'-hexamethylenebis(3,5-di-t-butyl-4-hydroxy-hydrocinnamamide), 3,5-di-t-butyl-4-hydroxybenzyl phosphonate-diethylester, 1,3,5-trimethyl-2,4,6-tris(3,5-di-t-butyl-4-hydroxybenzyl)benzene, bis(3,5-di-t-butyl-4-hydroxybenzyl ethylphosphonate)calcium, tris-(3,5-di-t-butyl-4-hydroxybenzyl)-isocyanurate, octylated diphenylamine, 2,4-bis[(octylthio)methyl]-o-cresol, 4,6-bis(octylthiomethyl)-o-cresol, 4,6-bis(dodecylthiomethyl)-o-cresol, isooctyl-3-(3,5-di-t-butyl-4-hydroxyphenyl)propionate, 2,6-di-t-butyl-4-methylphenol, tocopherol, 4-hydroxymethyl-2,6-di-t-butylphenol, 2,6-di-t-butyl-4-ethylphenol, 2,6-di-t-butyl-4-methoxyphenol, 2,2'-methylenebis(4-methyl-6-t-butylphenol), 2,2'-oxamidebis[ethyl-3-(3,5-di-t-butyl-4-hydroxyphenyl)propionate], 2,2'-ethylidenebis(4,6-di-t-butylphenol), 2,2'-methylenebis(4-ethyl-6-t-butylphenol), 4,4'-methylenebis(2,6-di-t-butylphenol), 4,4'-butylidenebis(2-t-butyl-5-methylphenol), 4,4'-thiobis(3-methyl-6-t-butylphenol), 1,1,3-tris(2-methyl-4-hydroxy-5-t-butylphenyl)butane, bis[3,3-bis(4'-hydroxy-3'-t-butylphenyl)butanoic acid]glycol ester, 1,4-benzenedicarboxylic acid bis[2-(1,1-dimethylethyl)-6-[[3-(1,1-(dimethylethyl)-2-hydroxy-5-methylphenyl)methyl]-4-methylphenyl]]ester, 1,3,5-tris(4-t-butyl-3-hydroxy-2,6-dimethylbenzyl)isocyanurate, 2-[1-(2-hydrooxy-3,5-di-t-pentylphenyl)ethyl]-4,6-di-t-pentylphenyl acrylate, 2-t-butyl-6-(3'-t-butyl-5'-methyl-2'-hydroxybenzyl)-4-methylphenyl acrylate, and 3,9-bis[2-[3-(3-t-butyl-4-hydroxy-5-methyl phenyl)propionyloxy]-1,1-dimethylethyl]-2,4,8,10-tetraoxaspiro[5,5]undecane. These phenol-based antioxidants may be used alone or in combination of two or more of them.

Note that product names of these phenol-based antioxidants are, for example, IRGANOX245, IRGANOX245FF, IRGANOX245DWJ, IRGANOX259, IRGANOX295, IRGANOX565, IRGANOX565DD, IRGANOX565FL, IRGANOX1010, IRGANOX1010FP, IRGANOX1010FF, IRGANOX1010DD, IRGANOX1035, IRGANOX1035FF, IRGANOX1076, IRGANOX1076FF, IRGANOX1076FD, IRGANOX1076DWJ, IRGANOX1098, IRGANOX1222, IRGANOX1330, IRGANOX1726, IRGANOX1425WL, IRGANOX3114, IRGANOX5057, IRGANOX1520L, IRGANOX1520LR, and IRGANOX1135.

Of these phenol-based antioxidants, octadecyl-3-(3,5-di-t-butyl-4-hydroxyphenyl)propionate [product name: IRGANOX1076], pentaerithrithyl-tetrakis[3-(3,5-di-t-butyl-4-hydroxyphenyl)propionate][product. name: IRGANOX1010], and tris-(3,5-di-t-butyl-4-hydroxybenzyl)-isocyanurate [product name: IRGANOX3114] are especially preferable from the perspective of suppression of resin degradation, in a case where the polyethylene resin particles to be foamed are obtained in the extrusion step.

Especially, octadecyl-3-(3,5-di-t-butyl-4-hydroxyphenyl) propionate [product name: IRGANOX1076] and pentaerithrithyl-tetrakis[3-(3,5-di-t-butyl-4-hydroxyphenyl)propionate][product name: IRGANOX1010] are relatively inexpensive and have been widely used, but have occasionally caused the problem of yellowing. Meanwhile, according to the present invention, in a case where the amount of the phosphorus-based antioxidant in the polyethylene resin composition is not less than 500 ppm to not more than 1500 ppm and the antioxidant ratio is not less than 2.0 to not more than 7.5, it is possible to produce an effect of remarkably improving the problem of yellowing. Especially in a case where the amount of the phosphorus-based antioxidant in the polyethylene resin composition is not less than 800 ppm to not more than 1200 ppm and the antioxidant ratio is not less than 2.5 to not more than 5.0, it is possible to obtain an effect of more remarkably improving the problem of yellowing.

In the present invention, the polyethylene resin composition can contain a metal stearate from the perspective of suppression of corrosion of an extruder and a molding machine to which the polyethylene resin composition is supplied and suppression of resin degradation.

Specific examples of the metal stearate encompass calcium stearate, magnesium stearate, and zinc stearate. These metal stearates may be used alone or in combination of two or more of them.

Of these metal stearates, calcium stearate is more preferable from the perspective of suppression, through effective neutralization of a residue of a catalyst used for polymerization of the polyethylene resin, of (i) resin degradation and (ii) corrosion of an extruder and a molding machine to which the polyethylene resin composition is supplied.

In the present invention, Mz of the polyethylene resin foamed particles is not less than $40 \times 10^4$ to not more than $70 \times 10^4$. This makes it possible to further inhibit the polyethylene resin foamed particles from having extremely small cell diameters even in a case where the metal stearate that can act as a foam nucleating agent is added.

In the present invention, it is more preferable that an amount of the metal stearate contained in the polyethylene resin composition be not less than 200 ppm to not more than 700 ppm.

If the amount of the metal stearate is less than 200 ppm, the neutralization of the residue of the catalyst used for polymerization of the polyethylene resin tends to become insufficient, and this tends to make it difficult to suppress corrosion of the extruder and the molding machine to which the polyethylene resin composition is supplied.

If the amount of the metal stearate is more than 700 ppm, it tends to make it impossible to inhibit the polyethylene resin foamed particles from having extremely small cell diameters, and therefore the polyethylene resin in-mold foam molded article tends to have a less smooth surface.

In the present invention, the polyethylene resin composition can contain an inorganic substance for the purpose of obtaining an effect of adjusting the cell diameters of the polyethylene resin foamed particles and/or an effect of uniforming cell structures and for the purpose of improving an expansion ratio.

In the present invention, it is more preferable that an amount of the inorganic substance contained in the polyethylene resin composition is not less than 300 ppm to not more than 2500 ppm, even more preferably not less than 400 ppm to not more than 2000 ppm, from the above perspectives. Note that the inorganic substance need not necessarily be contained in the polyethylene resin composition. That is, the amount of the inorganic substance contained in the polyethylene resin composition may be 0 ppm.

In the present invention, Mz of the polyethylene resin foamed particles is not less than $40 \times 10^4$ to not more than $70 \times 10^4$. This makes it possible to further inhibit the polyethylene resin foamed particles from having extremely small cell diameters even in a case where the inorganic substance that can act as a foam nucleating agent is added.

However, if the amount of the inorganic substance is more than 2500 ppm, it tends to make it impossible to inhibit the polyethylene resin foamed particles from having extremely small cell diameters, and therefore the polyethylene resin in-mold foam molded article tends to have a less smooth surface.

Examples of the inorganic substance used in the present invention encompass talc, hydrotalcite, calcium carbonate, silica, kaolin, barium sulfate, calcium hydroxide, aluminum hydroxide, aluminum oxide, titanium oxide, zeolite, zinc borate, and magnesium borate. These inorganic substances may be used alone or in combination of two or more of them.

Of these inorganic substances, talc is more preferable from the perspective of obtaining the effect of adjusting the cell diameters of the polyethylene resin foamed particles and/or the effect of uniforming cell structures and from the perspective of improving an expansion ratio.

In the present invention, it is more preferable that the polyethylene resin composition contain, as a hydrophilic compound, at least one type selected from the group consisting of glycerin, polyethylene glycol, and glycerin ester of fatty acid having a carbon number of not less than C10 to not more than C25 since it is possible to easily obtain polyethylene resin foamed particles with a high expansion ratio.

Of these hydrophilic compounds, glycerin and/or polyethylene glycol are more preferable, and glycerin is especially preferable, from the perspective of easiness of obtaining polyethylene resin foamed particles with a high expansion ratio even if it is contained in a small amount.

Note that polyethylene glycol is a nonionic water-soluble polymer having a structure in which ethylene glycol is polymerized, and has a molecular weight of approximately not more than 50000. An average molecular weight of polyethylene glycol used in the present invention is more preferably not less than 200 to not more than 9000, even more preferably not less than 200 to not more than 600.

The glycerin ester of fatty acid having a carbon number of not less than C10 to not more than C25 is more preferably monoester, diester, or triester each made up of stearic acid and glycerin or a mixture of these esters.

It is more preferable that an amount of the at least one hydrophilic compound contained in the polyethylene resin composition which hydrophilic compound is selected from the group consisting of glycerin, polyethylene glycol, and glycerin ester of fatty acid having a carbon number of not less than C10 to not more than C25 be not less than 50 ppm to not more than 20000 ppm, even more preferably not less than 50 ppm to not more than 5000 ppm.

If the amount of the hydrophilic compound is less than 50 ppm, it tends to make it difficult to increase an expansion ratio. Meanwhile, if the amount of the hydrophilic compound is more than 20000 ppm, it tends to make it difficult to achieve a further improvement in expansion ratio.

In the present invention, another hydrophilic compound may be additionally used unless the object of the present invention is not impaired.

Specific examples of such another hydrophilic compound encompass water-soluble inorganic substances such as sodium chloride, calcium chloride, magnesium chloride, borax, calcium borate, and zinc borate; water-absorbent organic substances such as melamine, isocyanuric acid, and a melamine/isocyanuric acid condensate; fatty alcohols having a carbon number of not less than C12 to not more than C18 such as cetyl alcohol and stearyl alcohol. Other examples of such another hydrophilic compound are 1,2,4-butanetriol, diglycerin, pentaerythritol, trimethylolpropane, sorbitol, D-mannitol, erythritol, hexanetriol, xylitol, D-xylose, inositol, fructose, galactose, glucose, and mannose.

Further, an additive of various kinds may be additionally used unless the object of the present invention is not impaired. Examples of such an additive encompass compatibilizing agents, antistatic agents, colorants (inorganic pigments such as carbon black, ketchen black, iron black, cadmium yellow, cadmium red, cobalt violet, cobalt blue, iron blue, ultramarine blue, chrome yellow, zinc yellow, and barium yellow; organic pigments such as perylene pigments, polyazo pigments, quinacridone pigments, phthalocyanine pigments, perinone pigments, anthraquinone pigments, thioindigo pigments, dioxazine pigments, isoindolinone pigments, and quinophthalone pigments), flame retardants, and stabilizers other than a phosphorus-based antioxidant and a phenol-based antioxidant.

In producing the polyethylene resin foamed particles of the present invention, it is preferable to first produce the polyethylene resin particles to be foamed.

The polyethylene resin particles to be foamed can be produced, for example, by a method using an extruder. One specific example of such a method is a method of (i) mixing, with a polyethylene resin serving as a base resin, one or more compounds selected from the group consisting of antioxidants, metal stearates, and inorganic substances and, as needed, a hydrophilic compound and other additive, (ii) melting and kneading the mixture in an extruder, (iii) extruding it through a die, (iv) cooling it, and then (v) cutting it into particles with a cutter. Another specific example is a method of (i) mixing a part of an additive (or one or more of additives)

with a polyethylene resin serving as a base resin, (ii) melting and kneading the mixture in an extruder, (iii) extruding it through a die, (iv) cooling it, (v) cutting it into resin pellets with a cutter, and then again (vi) mixing a remaining part of the additive (or the rest of the additives) with the resin pellets, (vii) melting and kneading the mixture in an extruder, (viii) extruding it through a die, (ix) cooling it, and then (x) cutting it into particles with a cutter. It should be noted that it is possible to (i) prepare a masterbatch by melting and kneading a mixture of the polyethylene resin and an antioxidant, a metal stearate, an inorganic substance, a hydrophilic compound, and other additive, (ii) mix the masterbatch thus prepared with a base resin, and then (iii) produce, by the above method, polyethylene resin particles to be foamed.

A resin temperature of the polyethylene resin composition during melting and kneading in an extruder is not limited in particular, but is more preferably not less than 250° C. to not more than 320° C. That is, a more preferable aspect of the polyethylene resin particles to be foamed is polyethylene resin particles to be foamed obtained through melting and kneading in an extruder at a resin temperature in a range from not less than 250° C. to not more than 320° C.

Since the polyethylene resin composition of the present invention contains the particular amount of phosphorus-based antioxidant and phenol-based antioxidant, there observed no remarkable resin degradation even by the extrusion at the resin temperature of not less than 250° C. to not more than 320° C. In addition, the extrusion can be performed at a low resin viscosity. This makes it possible to keep a load applied to the extruder low even in a case where an amount of resin discharge is increased. It is therefore possible to improve productivity per unit time of the polyethylene resin particles to be foamed.

Since there occurs no remarkable resin degradation even by the extrusion at the resin temperature of not less than 250° C. to not more than 320° C., it is possible to suppress a decline in melt index and an increase in melt tension of the polyethylene resin particles to be foamed. This makes it possible to easily improve an expansion ratio in a later foaming step.

The polyethylene resin foamed particles of the present invention can be produced with the use of the polyethylene resin particles to be foamed thus obtained.

Therefore, a more preferable aspect of the polyethylene resin foamed particles is polyethylene resin foamed particles in which (i) a polyethylene resin composition contains a phosphorus-based antioxidant and a phenol-based antioxidant and (ii) the following two conditions are satisfied: (a1) an amount of the phosphorus-based antioxidant contained in the polyethylene resin composition is not less than 500 ppm to not more than 1500 ppm and (a2) a ratio of the amount of the phosphorus-based antioxidant to an amount of the phenol-based antioxidant in the polyethylene resin composition (the amount of the phosphorus-based antioxidant/the amount of the phenol-based antioxidant) is not less than 2.0 to not more than 7.5.

According to the polyethylene resin foamed particles of the present invention, even in a case where the polyethylene resin composition serving a base resin contains, in a relatively large amount of not less than 1000 ppm to not more than 4000 ppm in total, one or more compounds selected from the group consisting of antioxidants, metal stearates, and inorganic substances, it is possible to provide polyethylene resin foamed particles which are obtained by foaming polyethylene resin particles to be foamed that have good productivity and can be foamed at a high expansion ratio and which are suppressed in reduction of cell diameters and in resin degradation.

Especially, in a case where the particular amount of antioxidant is added in the present invention, an effect of suppressing resin degradation of the polyethylene resin composition is high, and therefore, in the extrusion step for producing polyethylene resin particles to be foamed, it is possible to produce good polyethylene resin particles to be foamed that are suppressed in resin degradation such as decomposition or cross-linking even at a high resin temperature of not less than 250° C. Since the extrusion can be performed at the high resin temperature of not less than 250° C., it is possible to reduce a load applied to the extruder and to improve productivity (discharge amount).

A more preferable aspect of the method for producing polyethylene resin foamed particles is, for example, a method including a foaming step of (i) dispersing polyethylene resin particles to be foamed and a foaming agent in an aqueous dispersion medium in a closed vessel, (ii) pressurizing and heating the mixture up to or above a softening temperature of the polyethylene resin particles to be foamed, and then (iii) releasing the polyethylene resin particles to be foamed impregnated with the foaming agent into a zone (generally, atmospheric pressure) whose pressure is lower than an internal pressure of the closed vessel, that is to say, a method for producing polyethylene resin foamed particles with the use of an aqueous dispersion system.

Specifically, for example, polyethylene resin particles to be foamed, an aqueous dispersion medium, and, as needed, a dispersant and the like are put into a closed vessel. Then, as needed, the closed vessel is depressurized (vacuumed). Next, a foaming agent is introduced until the pressure in the closed vessel becomes not less than 1 MPa (gage pressure) to not more than 2 MPa (gage pressure). Then, the mixture is heated up to or above a softening temperature of the polyethylene resin. The heating increases the pressure in the closed vessel to a range from approximately not less than 1.5 MPa (gage pressure) to not more than 5 MPa (gage pressure). After the heating, the foaming agent is further added as needed to adjust a foaming pressure to a desired one. Further, the temperature is held for a period of time ranging from 0 min to 120 min while fine-adjusting the temperature to a foaming temperature. Next, the polyethylene resin particles to be foamed impregnated with the foaming agent are released to a zone (generally, atmospheric pressure) whose pressure is lower than the internal pressure of the closed vessel, so as to obtain polyethylene resin foamed particles. Note that a pressure in a collecting vessel for collecting the polyethylene resin foamed particles is not limited in particular, provided that it is a pressure lower than the pressure in the closed vessel. The pressure in the collecting vessel is generally set to an atmospheric pressure by configuring part of the collecting vessel as a system open to an atmosphere. Setting the pressure in the collecting vessel to an atmospheric pressure is preferable since there is no need for a complicated facility for controlling the pressure.

In another preferable aspect, hot-water shower or steam is blown into the collecting vessel so as to be contacted with the polyethylene resin foamed particles that are being released, in order to increase the expansion ratio of the polyethylene resin foamed particles. In this case, the temperature in the collecting vessel is preferably in a range from not less than 60° C. to not more than 120° C., more preferably in a range from not less than 90° C. to not more than 110° C.

The foaming agent may be introduced by a method other than the above method. For example, the foaming agent may be introduced as follows. First, polyethylene resin particles to be foamed, an aqueous dispersion medium, and, as needed, a dispersant and the like are put into a closed vessel. Then, the closed vessel is vacuumed as needed. Next, the foaming agent is introduced while heating the mixture up to or above a softening temperature of the polyethylene resin. Alternatively, for example, the foaming agent may be introduced as follows. First, polyethylene resin particles to be foamed, an aqueous dispersion medium, and, as needed, a dispersant and the like are put into a closed vessel. Then, the mixture is heated up to approximately a foaming temperature, and at this point of time, the foaming agent is introduced. That is, a method for introducing a foaming agent to a dispersion system including polyethylene resin particles to be foamed, an aqueous dispersion medium, and, as needed, a dispersant and the like is not limited in particular.

Note that an example of a method of adjusting an expansion ratio and an average cell diameter of the polyethylene resin foamed particles is a method of (i) pressing carbon dioxide, nitrogen, air, a substance used as the foaming agent, or the like into the closed vessel before the release into a zone (hereinafter sometimes referred to as "low-pressure zone") whose pressure is lower than an internal pressure of the closed vessel, so as to increase the internal pressure of the closed vessel, (ii) adjusting a pressure releasing rate during foaming, and (iii) introducing carbon dioxide, nitrogen, air, a substance used as the foaming agent, or the like into the closed vessel during the release into the low-pressure area, so as to control the pressure. Alternatively, the expansion ratio and the average cell diameter can be adjusted by appropriately changing the temperature (approximately equal to the foaming temperature) in the closed vessel achieved before the release into the low-pressure zone.

It is preferable that the polyethylene resin foamed particles of the present invention exhibit two melting peak temperatures, i.e., a melting peak temperature on a low-temperature side and a melting peak temperature on a high-temperature side, on a DSC curve obtained from differential scanning calorimetry (DSC) measurement, as described later.

Such polyethylene resin foamed particles which exhibit two melting peak temperatures can be easily obtained by (i) setting, at an appropriate temperature, the temperature in the closed vessel (approximately equal to the foaming temperature) achieved before the release into the low-pressure zone and (ii) holding the temperature close to such an appropriate temperature for an appropriate period of time, in the above method for producing polyethylene resin foamed particles with the use of an aqueous dispersion system.

The temperature in the closed vessel is not limited in particular, provided it is equal to or higher than the softening temperature of the polyethylene resin particles to be foamed. The temperature in the closed vessel is generally selected from temperatures in a range from 10° C. below the melting point of the polyethylene resin serving as a base resin or higher, more preferably 5° C. below the melting point of the polyethylene resin or higher to lower than a melting end temperature of the polyethylene resin, more preferably 2° C. below the melting end temperature or lower.

The DSC curve is obtained by raising the temperature of not less than 1 mg to not more than 10 mg of the polyethylene resin from 40° C. to 190° C. at a rate of 10° C./min, cooling it to 40° C. at a rate of 10° C./min, and then again raising the temperature to 190° C. at a rate of 10° C./min in differential scanning calorimetry (DSC) measurement using a differential scanning calorimeter. The melting point of the polyethylene resin is a melting peak temperature at the second rise in temperature. The melting end temperature of the polyethylene resin is a temperature at which a hem of a melting peak curve obtained at the second rise in temperature returns to a position of a baseline on a high-temperature side.

It is preferable that the period of time for which the temperature in the closed vessel is held (hereinafter sometimes referred to as "holding time") falls in a range from more than 0 min to not more than 120 min, more preferably in a range from not less than 2 min to not more than 60 min, even more preferably in a range from not less than 10 min to not more than 40 min.

The closed vessel in which the polyethylene resin particles to be foamed are dispersed is not limited in particular, provided that it can withstand pressure and temperature in the vessel that are set during production of foamed particles. A specific example of the closed vessel is an autoclave pressure vessel.

Examples of the foaming agent used in the present invention encompass saturated hydrocarbons such as propane, butane, and pentane, ethers such as dimethyl ether, alcohols such as methanol and ethanol, and inorganic gases such as air, nitrogen, carbon dioxide, and steam (water). These foaming agents may be used alone or in combination of two or more of them.

Of these foaming agents, carbon dioxide and steam (water) are especially preferable, and carbon dioxide is most preferable since they are especially low in environmental load and has no risk of burning.

According to the present invention, a foaming property of the polyethylene resin particles to be foamed is improved since (i) resin degradation during production of the polyethylene resin particles to be foamed is suppressed and (ii) Mz of the polyethylene resin particles to be foamed is approximately not less than $40 \times 10^4$ to not more than $70 \times 10^4$. This makes it possible to achieve a higher expansion ratio as compared with a conventional art even by using carbon dioxide or steam (water) despite carbon dioxide and steam (water) are foaming agents with relatively weak foaming powers.

As the aqueous dispersion medium, it is preferable to use water alone, but it is also possible to use a dispersion medium obtained by adding methanol, ethanol, ethylene glycol, glycerin, or the like to water. Note that, according to the present invention, in a case where a hydrophilic compound is contained in the polyethylene resin particles to be foamed, water in the aqueous dispersion medium acts as a foaming agent and contributes to improvement in expansion ratio.

It is more preferable to use a dispersant in order to prevent the polyethylene resin particles to be foamed from being closely united with each other in the aqueous dispersion medium. Examples of the dispersant include inorganic dispersants such as tertiary calcium phosphate, tertiary magnesium phosphate, basic magnesium carbonate, calcium carbonate, barium sulfate, kaolin, talc, and clay.

Further, it is preferable to use a dispersion auxiliary agent together with the dispersant. Examples of the dispersion auxiliary agent encompass anionic surfactants of the carboxylate type such as N-acylamino-acid salt, alkyl ether carboxylate, and acyl peptide; anionic surfactants of the sulfonate type such as alkyl sulfonate, n-paraffin sulfonate, alkyl benzene sulfonate, alkyl naphthalene sulfonate, and sulfosuccinate; anionic surfactants of the sulfuric ester type such as sulfated oil, alkyl sulfate, alkyl ether sulfate, and alkyl amide sulfate; and anionic surfactants of the phosphoric ester type such as alkyl phosphate, polyoxyethylene phosphate, and alkyl aryl ether sulfate. It is also possible to use: polymer surfactants of the polycarboxylic acid type such as a salt of a maleic acid copolymer and polyacrylate; and polyanionic polymer surfactants such as polystyrene sulfonate and a salt of a naphthalene sulfonate formalin condensate.

Of these compounds presented above, it is especially preferable to use in combination (i), as the dispersant, one or more type selected from the group consisting of tertiary calcium phosphate, tertiary magnesium phosphate, barium sulfate, and kaolin, and (ii) n-paraffin sulfonate soda as the dispersion auxiliary agent.

The used amounts of the dispersant and the dispersion auxiliary agent vary according to their types and the type and amount of the polyethylene resin particles to be foamed that are used. Usually, it is preferable to mix the dispersant and the dispersion auxiliary agent in not less than 0.1 parts by weight to not more than 3 parts by weight and in not less than 0.001 part by weight to not more than 0.1 part by weight, respectively, to 100 parts by weight of the aqueous dispersion medium.

Further, it is preferable to use the polyethylene resin particles to be foamed in not less than 20 parts by weight to not more than 100 parts by weight to 100 parts by weight of the aqueous dispersion medium so that the dispersibility of the polyethylene resin particles to be foamed in the aqueous dispersion medium is satisfactory.

As an alternative to the method for producing polyethylene resin foamed particles with the use of the aqueous dispersion system, it is also possible to obtain polyethylene resin foamed particles without the use of an aqueous dispersion medium, for example, by directly contacting a foaming agent with polyethylene resin particles to be foamed in a closed vessel, impregnating the polyethylene resin particles to be foamed with the foaming agent so as to obtain foamable polyethylene resin particles, and then foaming the foamable polyethylene resin particles, for example, by contacting steam with the foamable polyethylene resin particles.

Such a step of obtaining polyethylene resin foamed particles from polyethylene resin particles to be foamed is sometimes referred to as a "first-stage foaming step" in the present invention, and polyethylene resin foamed particles thus obtained are sometimes referred to as "first-stage foamed particles". Further, it is possible to obtain polyethylene resin foamed particles that have an improved expansion ratio than the first-stage foamed particles by contacting steam of a particular pressure with the first-stage foamed particles after impregnating the first-stage foamed particles with an inorganic gas such as air, nitrogen, or carbon dioxide so as to impart an internal pressure to the first-stage foamed particles. Such a step of obtaining polyethylene resin foamed particles having a higher expansion ratio by further foaming polyethylene resin foamed particles which are first-stage foamed particles is sometimes referred to as a "second-stage foaming step" in the present invention, and polyethylene resin foamed particles obtained through such a second-stage foaming step are sometimes referred to as "second-stage foamed particles".

That is, the first-stage foaming step in the present invention refers to a step of producing polyethylene resin foamed particles by (i) dispersing, in an aqueous dispersion medium in a closed vessel together with a foaming agent, polyethylene resin particles to be foamed made of a polyethylene resin composition which contain, in an amount of not less than 1000 ppm to not more than 4000 ppm in total, one or more compounds selected from the group consisting of antioxidants, metal stearates, and inorganic substances, (ii) pressurizing and heating the mixture up to or above a softening temperature of the polyethylene resin particles to be foamed, and then (iii) releasing the polyethylene resin particles to be foamed into a zone whose pressure is lower than an internal pressure of the closed vessel. The second-stage foaming step in the present invention refers to a step of further foaming the polyethylene resin foamed particles obtained in the first-stage foaming step by (i) putting the polyethylene resin foamed particles into a pressure-resistant vessel, and (ii) impregnating the polyethylene resin foamed particles with an inorganic gas including at least one type of gas selected from the group consisting of air, nitrogen, and carbon dioxide so as to impart an internal pressure to the polyethylene resin foamed particles, and then heating the polyethylene resin foamed particles.

Specifically, the second-stage foaming step is a step of obtaining second-stage foamed particles that have an improved expansion ratio than the first-stage foamed particles by contacting the first-stage foamed particles with steam of a particular pressure after impregnating the first-stage foamed particles with air, nitrogen, carbon dioxide, or the like so as to impart an internal pressure to the first-stage foamed particles.

The pressure of the steam in the second-stage foaming step is adjusted to preferably not less than 0.045 MPa (gage pressure) to not more than 0.15 MPa (gage pressure), more preferably not less than 0.05 MPa (gage pressure) to not more than 0.1 MPa (gage pressure), in consideration of an expansion ratio etc. of the second-stage foamed particles.

The internal pressure of the inorganic gas with which the first-stage foamed particles are impregnated is desirably changed as appropriate in consideration of an expansion ratio etc. of the second-stage foamed particles, but is preferably not less than 0.2 MPa (absolute pressure) to not more than 0.6 MPa (absolute pressure).

The expansion ratio of the polyethylene resin foamed particles of the present invention is not limited in particular, and can be adjusted as needed. However, the expansion ratio of the polyethylene resin foamed particles is preferably not less than 2 times to not more than 50 times from the perspective of a reduction in weight. If the expansion ratio is less than 2 times, the effect of being light in weight is small. Meanwhile, if the expansion ratio is more than 50 times, the polyethylene resin in-mold foam molded article obtained by in-mold foam molding tends to be reduced in mechanical properties such as compressive stress.

The expansion ratio of the polyethylene resin foamed particles refers to a value calculated by measuring the weight w (g) of the polyethylene resin foamed particles, immersing the polyethylene resin foamed particles in ethanol contained in a measuring cylinder, and then measuring the volume v (cm$^3$) according to the surface elevation in the measuring cylinder (immersion method). That is, the expansion ratio of the polyethylene resin foamed particles refers to a value obtained by calculating the absolute specific gravity $\rho b$ (=w/v) of the polyethylene resin foamed particles on the basis of the above measurement, and calculating a ratio ($\rho r/\rho b$) of the density pr (g/cm$^3$) of the polyethylene resin serving as the base resin or of the polyethylene resin particles to be foamed to the absolute specific gravity $\rho b$.

The average cell diameter of the polyethylene resin foamed particles of the present invention is preferably not less than 180 μm to not more than 450 μm, more preferably not less than 200 μm to not more than 400 μm.

If the average cell diameter is less than 180 μm, the polyethylene resin in-mold foam molded article tends to have a less smooth surface with wrinkles and dents between foamed particles as a result of in-mold foam molding. Meanwhile, if the average cell diameter is more than 450 μm, the polyethylene resin in-mold foam molded article obtained by the in-mold foam molding tends to have reduced buffering properties.

The open-cell ratio of the polyethylene resin foamed particles of the present invention is preferably not more than 12%, more preferably not more than 10%, especially preferably not more than 6%. If the open-cell ratio is more than 12%, shrinkage occurs as a result of the in-mold foam molding, and the polyethylene resin in-mold foam molded article thus tends to be reduced in surface smoothness and compressive strength.

The polyethylene resin foamed particles of the present invention preferably have two melting peak temperatures, i.e., a melting peak temperature on a low-temperature side and a melting peak temperature on a high-temperature side, on a DSC curve obtained by differential scanning calorimetry (DSC) measurement. It is more preferable that the polyethylene resin foamed particles of the present invention have a shoulder peak in a region ranging from not less than 100° C. to not more than the melting peak temperature on the low-temperature side.

The DSC curve obtained by differential scanning calorimetry measurement of the polyethylene resin foamed particles refers to a DSC curve obtained by raising the temperature of not less than 1 mg to not more than 10 mg of the polyethylene resin foamed particles from 40° C. to 190° C. at a heating rate of 10° C./min with the use of a differential scanning calorimeter.

In the present invention, quantity of heat (Q1) of the melting peak on the low-temperature side, quantity of heat (Qh) of the melting peak on the high-temperature side, and quantity of heat (Qs) of the shoulder peak are defined as follows (see FIG. 1). Specifically, the quantity of heat (Qh) of the melting peak on the high-temperature side is a part surrounded by a segment AB and the DSC curve, and the quantity of heat (Q1) of the melting peak on the low-temperature side is a part surrounded by a segment AC and the DSC curve. Note that A is a point at which the smallest quantity of heat absorption is reached between the two melting peaks (i.e., the melting peak on the low-temperature side and the melting peak on the high-temperature side) of the DSC curve, B and C are a tangent point on the high-temperature side and a tangent point on the low-temperature side, respectively, of a tangent drawn from the point A to the DSC curve. The quantity of heat (Qs) of the shoulder peak is a part surrounded by a segment DE and the DSC curve. Note that D is an inflection point that corresponds to a hem on the high-temperature side of a shoulder peak curve of the DSC curve, and E is a tangent point of a tangent drawn from the point D to the DSC curve on the low-temperature side. The quantity of heat (Qs) of the shoulder peak is included in the quantity of heat (Q1) of the melting peak on the low-temperature side.

A ratio of the quantity of heat (Qs) of the shoulder peak to the quantity of heat (Q1) of the melting peak on the low-temperature side (expressed by $(Qs/Q1) \times 100(\%)$; hereinafter sometimes referred to as a "shoulder ratio") in the DSC curve of the polyethylene resin foamed particles of the present invention is not limited in particular, but is preferably not less than 0.2% to not more than 3%, more preferably not less than 0.2% to not more than 1.6%. If the shoulder ratio is less than 0.2%, the polyethylene resin in-mold foam molded article to be obtained tends to be low in fusion level at ends (edge) thereof and in appearance, and the polyethylene resin in-mold foam molded article tends to have a less smooth surface. Meanwhile, if the shoulder ratio is more than 3%, it is feared that the polyethylene resin foamed particles are closely united with each other so as to cause blocking, and cannot be supplied to subsequent in-mold foam molding.

Such polyethylene resin foamed particles having a shoulder peak on a DSC curve can be obtained, for example, by a method including the second-stage foaming step. Specifically, in order to develop a shoulder peak on a DSC curve, the pressure of the steam in the second-stage foaming step is preferably adjusted to not less than 0.045 MPa (gage pressure) to not more than 0.15 MPa (gage pressure), more preferably not less than 0.05 MPa (gage pressure) to not more than 0.1 MPa (gage pressure). The shoulder peak ratio tends to be higher as the pressure of the steam in the second-stage foaming step becomes larger. Further, in this case, it is desirable to appropriately change the internal pressure of the inorganic gas with which the first-stage foamed particles are impregnated, in consideration of the expansion ratio etc. of the second-stage foamed particles, but it is preferable that the internal pressure of the inorganic gas be not less than 0.2 MPa (absolute pressure) to not more than 0.6 MPa (absolute pressure).

Meanwhile, a ratio of the quantity of heat (Qh) of the melting peak on the high-temperature side to the whole melting quantity of heat (expressed by $Qh/(Q1+Qh) \times 100$; hereinafter sometimes referred to as a "DSC ratio") is not limited in particular, but is preferably not less than 20% to not more than 55%. If the DSC ratio is less than 20%, foaming power of the polyethylene resin foamed particles becomes too high, so that only polyethylene resin foamed particles in the vicinity of a mold surface (in a superficial part of the polyethylene resin in-mold foam molded article) are explosively foamed and fused with each other at an initial stage of in-mold foam molding. This tends to result in a polyethylene resin in-mold foam molded article which is poor in terms of fusion since steam used for the in-mold foam molding does not infiltrate into polyethylene resin foamed particles located in an inner part of the mold and fusion does not occur in an inner part of the foam molded article. If the DSC ratio is more than 55%, foaming power of the polyethylene resin foamed particles is too low. This tends to result in a polyethylene resin in-mold foam molded article that is poor in terms of fusion on the whole or tends to require a high molding pressure in order to cause fusion throughout the polyethylene resin in-mold foam molded article. Note that the DSC ratio can be adjusted by appropriately changing (i) the temperature in the closed vessel achieved before the release into the low-pressure zone and (ii) the holding time, in the process for obtaining polyethylene resin foamed particles. In general, the DSC ratio tends to become larger as the temperature (foaming temperature) in the closed vessel becomes lower. Further, the DSC ratio tends to become larger as the holding time becomes longer. Accordingly, several experiments in which the temperature in the closed vessel and the holding time are varied make it possible to find out a condition for obtaining a generally desired DSC ratio.

According to the method of the present invention for producing polyethylene resin foamed particles, it is possible to produce polyethylene resin foamed particles that are suppressed in reduction of cell diameters and resin degradation even in a case where (i) carbon dioxide which is a foaming agent with relatively weak foaming power is used and (ii) relatively large amounts of phosphorus-based antioxidant and phenol-based antioxidant are contained. Further, the polyethylene resin foamed particles thus obtained can have a high expansion ratio.

The polyethylene resin foamed particles thus obtained can be molded, by conventionally known in-mold foam molding, into a polyethylene resin in-mold foam molded article.

A specific method for molding the polyethylene resin in-mold foam molded article by conventionally known in-mold foam molding is not limited in particular, but can be, for example, (I) a method including subjecting the polyethylene resin foamed particles to pressure treatment with an inorganic gas such as air, nitrogen, or carbon dioxide, impregnating the polyethylene resin foamed particles with the inorganic gas to impart a predetermined internal pressure to the polyethylene resin foamed particles, filling a mold with the polyethylene resin foamed particles, and fusing the polyethylene resin foamed particles by heat of steam; (II) a method including filling a mold with the polyethylene resin foamed particles by compressing the polyethylene resin foamed particles with pressure of an inorganic gas, fusing the polyethylene resin foamed particles by heat of steam with use of the resilience of the polyethylene resin foamed particles; and (III) a method including filling a mold with the polyethylene resin foamed particles without particular pretreatment and fusing the polyethylene resin foamed particles by heat of steam.

Molding conditions, such as a molding pressure, in the in-mold foam molding are not limited in particular, and the molding can be performed under conventionally known conditions with appropriate adjustment.

The density of the polyethylene resin in-mold foam molded article in the present invention can be appropriately set in accordance with the expansion ratio of the polyethylene resin foamed particles, a desired strength of the polyethylene resin in-mold foam molded article, or the like. In general, the density of the polyethylene resin in-mold foam molded article is preferably not less than 10 g/L to not more than 300 g/L, more preferably not less than 14 g/L to not more than 100 g/L. From the perspective of sufficient achievement of a buffering property which is an excellent property of the polyethylene resin in-mold foam molded article, the density is even more preferably not less than 16 g/L to not more than 50 g/L.

The polyethylene resin in-mold foam molded article obtained by in-mold foam molding of the polyethylene resin foamed particles is reduced in surface yellowing which can occur during in-mold foam molding and is excellent in surface smoothness. It is therefore possible to provide a polyethylene resin in-mold foam molded article which is reduced in surface yellowing which can occur during in-mold foam molding and is good in surface smoothness.

EXAMPLES

In the following, the present invention is described more specifically with reference to Examples and Comparative Examples; however, the present invention is not limited solely to these Examples. Note that a technical content described in each Example can be used in combination with a technical content described in another Example as appropriate.

It should be noted that evaluations in Examples and Comparative Examples were carried out according to the following methods.

<Mz Measurement Method>

A Z-average molecular weight (Mz; converted in terms of polystyrene) of a polyethylene resin which serves as a base resin, polyethylene resin particles to be foamed, or polyethylene resin foamed particles was obtained under the following measurement conditions by gel permeation chromatography (GPC).

(Measurement Conditions)
Pretreatment of Sample: 7 mg of a sample was precisely weighed and fully dissolved in 9 mL of o-dichlorobenzene (containing 1 g/L of BHT (dibutyl hydroxytoluene)) at 140° C. The resulting solution was filtered and was used as a sample to be analyzed.
Measurement Device: GPCV 2000 system (manufactured by Waters Alliance)
Column: 1 column of Shodex UT-G, 2 columns of Shodex UT-806M, 1 column of Shodex UT-807
Column Temperature: 140° C.
Carrier: o-dichlorobenzene (containing 1 g/L of BHT) for high performance liquid chromatograph
Carrier Flow Amount: 1.0 mL/min
Sample Concentration: approximately 0.8 mg/mL
Sample Solution Filtering: membrane filter having a pore diameter of 0.5 μm manufactured by PTFE
Injection Amount: 317 μL
Analysis Time: 50 minutes
Analysis Software: Empower GPC/V (manufactured by Waters Alliance)
Detector: differential refractive index detector (RI)
Used Standard Sample (10 types in total): 9 types of standard polystylene (Shodex Standard) having molecular weights of $7.30 \times 10^6$, $3.85 \times 10^6$, $2.06 \times 10^6$, $7.36 \times 10^5$, $1.97 \times 10^5$, $2.20 \times 10^4$, $1.28 \times 10^4$, $7.20 \times 10^3$, $3.95 \times 10^3$: 1 type of polystylene A-300 (Shodex) having a molecular weight of $3.70 \times 10^2$ <Melt Index (MI) of Polyethylene Resin Etc.>

A melt index (MI) of the polyethylene resin or the polyethylene resin particles to be foamed was measured at a temperature of 190° C. and a load of 2.16 kg in accordance with JIS K7210.

<Melt Tension (MT) of Polyethylene Resin Particles to be Foamed>

A melt tension (MT) of the polyethylene resin particles to be foamed was measured under the following conditions by use of CAPILOGRAPH 1D manufactured by TOYOSEIKI SEISAKU-SHO, LTD.:
Measurement Temperature: 190° C.
Barrel Internal Diameter: 9.55 mm
Capillary: 2.095 mm (D)×8.02 mm (L), inflow angle of 60°
Piston extrusion Speed: 10 mm/min
Haul-off speed: 78.5 m/min (corresponding to 500 rpm of a roller 50 mm in diameter)
Contact point distance between capillary tip and pulley for measurement of melt tension: 53 cm Note that although the melt tension has amplitude on a chart, a medium value of the amplitude is used as the melt tension in the present invention.

<DSC Measurement of Polyethylene Resin Foamed Particles>

Melting peak temperatures (a melting peak temperature on the low-temperature side and a melting peak temperature on the high-temperature side), a DSC ratio, a shoulder peak ratio, or melting quantity of heat was calculated from a DSC curve obtained by differential scanning calorimetry (DSC) measurement at the first rise in temperature of raising temperature of 3 mg to 6 mg of polyethylene resin foamed particles from 40° C. to 190° C. at a heating rate of 10° C./min by a differential scanning calorimeter (manufactured by Seiko Instruments Inc., DSC6200).

<Expansion Ratio>

Not less than 3 g to not more than 10 g of polyethylene resin foamed particles was weighed, and was then dried at 60° C. for 6 hours. Then, the status of the polyethylene resin foamed particles was regulated in a room at a temperature of 23° C. and a humidity of 50%. Next, the weight w(g) of the polyethylene resin foamed particles was measured, and then the polyethylene resin foamed particles were immersed in ethanol contained in a measuring cylinder, and the volume v (cm$^3$) of the polyethylene resin foamed particles was measured according to the surface elevation of the measuring cylinder (immersion method). Then, the absolute specific gravity ρb (=w/v) of the polyethylene resin foamed particles was obtained from the volume v (cm$^3$), and the expansion ratio K (=ρr/ρb) was calculated from the ratio of the density ρr (g/cm$^3$) of the polyethylene resin particles to be foamed to the absolute specific gravity ρb. Note that in Examples and Comparative Examples described below, the density ρr of the polyethylene resin particles to be foamed was 0.93 g/cm$^3$.

<Uniformity of Cells>

The polyethylene resin foamed particles were cut substantially in the middle so as not to break a cell membrane (cell membrane of the polyethylene resin foamed particles), and each of the cross-sections thus exposed was observed with a microscope [digital microscope VHX-100 manufactured by KEYENCE CORPORATION]. The uniformity of the cells was evaluated as follows:

Good: All the cells look substantially uniform in cell diameter as a result of the observation with the microscope.

Poor: There are many cells with clearly different cell diameters as a result of the observation with the microscope.

<Average Cell Diameter>

The polyethylene resin foamed particles were cut substantially in the middle so as not to break a cell membrane (cell membrane of the polyethylene resin foamed particles), and each of the cross-sections thus exposed was observed with a microscope [digital microscope VHX-100 manufactured by KEYENCE CORPORATION]. Then, a segment of 1000 μm in length was drawn on a part other than a superficial part of the polyethylene resin foamed particles, and the number of cells n present in the segment was measured. Then, the cell diameter was calculated from the number of cells n according to 1000/n (μm). Similar measurement was carried out with the use of 10 polyethylene resin foamed particles, and an average value of cell diameters calculated for these polyethylene resin foamed particles was calculated as an average cell diameter.

<Open-Cell Ratio>

The open-cell ratio (%) was obtained in accordance with the following equation:

open-cell ratio (%)=(($Va-Vc$)×100)/$Va$ where $Vc$ (cm$^3$) is a volume of the polyethylene resin foamed particles obtained in accordance with the method described in the PROSEDURE C of ASTM D2856-87.

Note that $Vc$ was measured by using an air-comparison pycnometer Model 1000 manufactured by Tokyoscience Co., Ltd. Note also that the volume $Va$ (cm$^3$) is an apparent volume of the polyethylene resin foamed particles obtained according to the surface elevation (immersion method) by immersing, in ethanol contained in a measuring cylinder, the whole amount of the polyethylene resin foamed particles whose $Vc$ had been measured by the air-comparison pycnometer.

<Fusibility of Polyethylene Resin in-Mold Foam Molded Article>

In-mold foam molding was carried out by using a mold for producing a polyethylene resin in-mold foam molded article of 400 mm×300 mm×50 mm in dimension, without imparting an internal pressure to the polyethylene resin foamed particles in the mold, while changing a molding pressure in a range from 0.08 MPa (gage pressure) to 0.14 MPa (gage pressure) by increments of 0.01 MPa. The foam molded article thus obtained was left at rest at 23° C. for 2 hours, cured at 65° C. for 24 hours, and then left at rest at 23° C. for 4 hours. This foam molded article was used as a polyethylene resin in-mold foam molded article to be evaluated.

A crack of approximately 5 mm in depth was made with a knife to a surface of the polyethylene resin in-mold foam molded article to be evaluated, and then the polyethylene resin in-mold foam molded article was split along the crack. Then, the cross sections thus exposed were observed. A ratio of broken particles to all the particles on the cross sections was obtained as a molded article fusion ratio (%).

A minimum molding pressure (gage pressure) which allows the molded article fusion ratio to reach 70% or more was used as an index of fusibility.

<Evaluation of Yellowing of Polyethylene Resin in-Mold Foam Molded Article>

Immediately after carrying out in-mold foam molding at a molding pressure of 0.11 MPa (gage pressure) by using the mold used for the measurement of the fusibility, without imparting an internal pressure to the polyethylene resin foamed particles in the mold, a surface of a polyethylene resin in-mold foam molded article thus obtained was observed visually, and yellowing of the polyethylene resin in-mold foam molded article was evaluated as follows:

Good: No yellowing was observed.

Average: Slight yellowing was observed.

Poor: Yellowing was clearly observed.

<Surface Smoothness of Polyethylene Resin in-Mold Foam Molded Article>

In-mold foam molding was carried out at a molding pressure of 0.11 MPa (gage pressure) with the use of the mold used for the measurement of the fusibility without imparting an internal pressure to the polyethylene resin foamed particles in the mold. A polyethylene resin in-mold foam molded article thus obtained was left at rest at 23° C. for 2 hours, cured at 65° C. for 24 hours, and then left in a room at 23° C. for 4 hours. Then, a surface of the polyethylene resin in-mold foam molded article was observed visually, and surface smoothness of the polyethylene resin in-mold foam molded article was evaluated as follows:

Good: The polyethylene resin in-mold foam molded article has almost no wrinkle and no dent between foamed particles and no noticeable surface unevenness, and is good in appearance.

Average: The polyethylene resin in-mold foam molded article has (i) slight surface unevenness due to wrinkles and dents between foamed particles and (ii) sink marks, and has slightly bad appearance.

Poor: The polyethylene resin in-mold foam molded article has (i) remarkable surface unevenness due to wrinkles and dents between foamed particles and (ii) slight sink marks, and has bad appearance.

Very poor: The polyethylene resin in-mold foam molded article has large sink marks and shrinkage in addition to wrinkles and dents between foamed particles, and has clearly bad appearance.

<Density of Polyethylene Resin in-Mold Foam Molded Article>

The weight of the polyethylene resin in-mold foam molded article whose surface smoothness had been evaluated was measured, and the volume of the polyethylene resin in-mold foam molded article was calculated by measuring the dimension (length, width, and thickness) with a vernier caliper. Next, the weight was divided by the volume in order to calculate the density (g/L) of the polyethylene resin in-mold foam molded article.

Table 1 shows physical properties of polyethylene resins (A-1, A-2, A-3, B-1, B-2) which are base resins used in Reference Examples, Examples, and Comparative Examples below.

TABLE 1

| Polyethylene resin | Mz | Melting point | Density | Melt index |
|---|---|---|---|---|
| Linear low-density polyethylene resin A-1 | 40 × 10$^4$ | 122° C. | 0.93 g/cm$^3$ | 1.8 g/10 min |
| Linear low-density polyethylene resin A-2 | 49 × 10$^4$ | 122° C. | 0.93 g/cm$^3$ | 1.8 g/10 min |
| Linear low-density polyethylene resin A-3 | 68 × 10$^4$ | 122° C. | 0.93 g/cm$^3$ | 1.8 g/10 min |
| Linear low-density polyethylene resin B-1 | 35 × 10$^4$ | 122° C. | 0.93 g/cm$^3$ | 1.9 g/10 min |

TABLE 1-continued

| Polyethylene resin | Mz | Melting point | Density | Melt index |
|---|---|---|---|---|
| Linear low-density polyethylene resin B-2 | 77 × 10⁴ | 122° C. | 0.93 g/cm³ | 1.8 g/10 min |

Reference Examples 1 to 9

Production of Polyethylene Resin Particles to be Foamed

To 20 kg of a linear low-density polyethylene resin, a phosphorus-based antioxidant, a phenol-based antioxidant, a metal stearate, an inorganic substance, and other additive were mixed in amounts described in Table 2. The mixture thus obtained was supplied to a two-screw extruder 45 mm in diameter (manufactured by O. N. MACHINERY, TEK45), and was melted and kneaded under the extrusion conditions described in Table 2. Subsequently, the mixture was extruded through a cylindrical die having a diameter of 1.8 mm connected to an end of the extruder, was cooled with water, and was then cut into cylindrical polyethylene resin particles to be foamed (1.3 mg/particle) with a cutter. Note that the resin temperature was one measured by a resin temperature indicator attached to the die connected next to the end of the screws of the two-screw extruder.

A melt index, a melt tension, and Mz of the polyethylene resin particles to be foamed thus obtained were evaluated. The result is shown in Table 2.

A comparison between Reference Example 1 and Reference Example 2 or a comparison between Reference Example 4 and Reference Example 5 shows that an increase in discharge amount of the mixture from 20 kg/hr to 30 kg/hr leads to an increase in load applied to the extruder.

A comparison between Reference Example 1 and Reference Example 3 shows that, in a case where an antioxidant ratio is 1.5, an increase in resin temperature from 210° C. to 290° C. results in a decline in load applied to the extruder, but results in a decline in melt index and an increase in melt tension of the polyethylene resin particles to be foamed. It is hypothesized that this is because degradation of the polyethylene resin occurred at the resin temperature of 290° C. by undergoing decomposition and cross-linking in the extruder.

A comparison between Reference Example 4 and Reference Example 6 shows that, in a case where the antioxidant ratio is 3.3, an increase in resin temperature from 210° C. to 290° C. results in a decline in load applied to the extruder, but causes no change in melt index and in melt tension of the polyethylene resin particles to be foamed. It is hypothesized that this is because the degradation of the polyethylene resin was suppressed even at the resin temperature of 290° C. since the antioxidant ratio was set to 3.3.

A comparison between Reference Example 4 and Reference Example 7 shows that, in a case where the antioxidant ratio is 3.3, an increase in resin temperature from 210° C. to 290° C. makes it possible to increase the discharge amount of the mixture without increasing the load applied to the extruder and to suppress degradation of the polyethylene resin.

A comparison between Reference Example 8 and Reference Example 9 shows that, in a case where the polyethylene resin particles to be foamed are obtained at a high resin temperature of 290° C., there occurs, in a case where a total

TABLE 2

| | | | Reference Examples | | | | | | | | | |
|---|---|---|---|---|---|---|---|---|---|---|---|---|
| | | | 1 | 2 | 3 | 4 | 5 | 6 | 7 | 8 | 9 | 10 |
| Polyethylene resin | | — | A-2 | A-2 | A-2 | A-2 | A-2 | A-2 | A-2 | A-2 | A-2 | B-2 |
| phosphorus-based antioxidant | IRGAFOS168 | ppm | 450 | 450 | 450 | 1000 | 1000 | 1000 | 1000 | 1000 | 750 | 1000 |
| phenol-based antioxidant | IRGANOX1076 | ppm | 300 | 300 | 300 | 300 | 300 | 300 | 300 | | | 300 |
| | IRGANOX1010 | ppm | | | | | | | | 300 | 250 | |
| Antioxidant ratio | | — | 1.5 | 1.5 | 1.5 | 3.3 | 3.3 | 3.3 | 3.3 | 3.3 | 3.0 | 3.3 |
| Total amount of antioxidant | | ppm | 750 | 750 | 750 | 1300 | 1300 | 1300 | 1300 | 1300 | 1000 | 1300 |
| metal stearate | calcium stearate | ppm | 400 | 400 | 400 | 400 | 400 | 400 | 400 | 400 | 400 | 400 |
| Inorganic substance | Talc | ppm | 300 | 300 | 300 | 300 | 300 | 300 | 300 | 300 | 1000 | 300 |
| Total amounts of antioxidant + metal stearate + inorganic substance | | ppm | 1450 | 1450 | 1450 | 2000 | 2000 | 2000 | 2000 | 2000 | 2400 | 2000 |
| Other additive | Glycerin | ppm | 2000 | 2000 | 2000 | 2000 | 2000 | 2000 | 2000 | 2000 | 2000 | 2000 |
| Extrusion condition | Temperature of extruder | ° C. | 200 | 200 | 275 | 200 | 200 | 275 | 275 | 275 | 275 | 200 |
| | Revolutions of screw | rpm | 50 | 50 | 50 | 50 | 50 | 50 | 50 | 50 | 50 | 50 |
| | Discharge amount | kg/hr | 20 | 30 | 20 | 20 | 30 | 20 | 30 | 20 | 20 | 20 |
| | Resin temperature | ° C. | 210 | 210 | 290 | 210 | 210 | 290 | 290 | 290 | 290 | 210 |
| | Load applied to extruder | ampere | 90 | 105 | 70 | 90 | 105 | 65 | 75 | 65 | 65 | 93 |
| Polyethylene resin particles to be foamed | Melt index | g/10 min | 1.8 | 1.8 | 1.3 | 1.8 | 1.8 | 1.8 | 1.8 | 1.8 | 1.7 | 1.8 |
| | Melt tension | g | 1.4 | 1.4 | 3.0 | 1.4 | 1.4 | 1.4 | 1.4 | 1.4 | 1.9 | 1.4 |
| | Mz (×10⁻⁴) | — | 50 | 50 | 51 | 50 | 50 | 50 | 50 | 50 | 50 | 78 |
| | Resin particle No. | | P-1 | — | P-2 | P-3 | — | P-4 | P-5 | P-6 | P-7 | P-8 | amount of the phosphorus-based antioxidant and the phenol-based antioxidant is less than 1100 ppm, a slight decline in melt index and a slight increase in melt tension. This suggests that slight degradation of the polyethylene resin occurred.

Example 1

Production of Polyethylene Resin Foamed Particles

Into a pressure-resistant closed vessel, 100 parts by weight of the polyethylene resin particles to be foamed P-1 obtained in Reference Example 1 were fed together with 200 parts by weight of pure water, 0.5 part by weight of tertiary calcium phosphate, and 0.05 parts by weight of n-paraffin sulfonate soda. After deairing, and while stirring, 7.5 parts by weight of carbon dioxide were put into the pressure-resistant closed vessel, which was then heated to 122° C. The internal pressure (foaming pressure) of the pressure-resistant closed vessel at a point when the temperature in the pressure-resistant closed vessel reached 122° C. was 3.4 MPa (gage pressure). After the temperature in the pressure-resistant closed vessel reached 122° C., the temperature was held for 25 minutes, and then the water dispersion (foamed particles and an aqueous dispersion medium) was released into a foaming cylinder under atmospheric pressure through an orifice by opening a valve installed in the lower part of the closed vessel, thus giving foamed particles (first-stage foamed particles). During the release, the internal pressure of the pressure-resistant closed vessel was retained so as not to decrease, by additionally pressing carbon dioxide into the pressure-resistant closed vessel. In addition, steam was blown into the foaming cylinder so as to heat the foaming cylinder and to make contact with the foamed particles that were being released.

The first-stage foamed particles thus obtained exhibited two melting points of 117° C. and 128° C. in differential scanning calorimetry measurement, a DSC ratio of 30%, and no shoulder peak. The first-stage foamed particles were found to have an expansion ratio of 11 times, to be excellent in uniformity of cells, to have an average cell diameter of 130 μm, and to have an open-cell ratio of 2%.

Next, the first-stage foamed particles thus obtained were subjected to second-stage foaming by drying them for six hour at 60° C., setting the internal pressure at approximately 0.57 MPa (absolute pressure) through impregnating them with pressurized air in a pressure-resistant vessel, and bringing them into contact with steam of approximately 0.06 MPa (gage pressure).

The second-stage foamed particles thus obtained exhibited two melting points of 118° C. and 128° C. in differential scanning calorimetry measurement, a DSC ratio of 40%, a shoulder peak ratio of 0.3%, and Mz of $50\times10^4$. The second-stage foamed particles were found to have an expansion ratio of 26 times, to be excellent in uniformity of cells, to have an average cell diameter 250 μm, and to have an open-cell ratio of 5%.

<Production of Polyethylene Resin in-Mold Foam Molded Article>

The second-stage foamed particles thus obtained were in-mold foam molded by filling a mold of 400 mm×300 mm×50 mm with them without imparting an internal pressure to them. The in-mold foam molding was carried out by changing a foaming pressure in a range from 0.08 MPa (gage pressure) to 0.14 MPa (gage pressure) by increments of 0.01 MPa. Durations of exhaust, one-side heating, other-side heating, and two-side heating were 3 sec, 7 sec, 7 sec, and 10 sec, respectively regardless of the foaming pressure. A polyethylene resin in-mold foam molded article thus obtained was evaluated in terms of fusibility, yellowing, and surface smoothness. The result is shown in Table 3.

Examples 2-6

Polyethylene resin foamed particles and a polyethylene resin in-mold foam molded article were obtained in a similar manner to Example 1 except for that the polyethylene resin particles to be foamed P-3 through P-7 obtained in Reference Examples (see Table 3) were used instead of the polyethylene resin particles to be foamed P-1. The result is shown in Table 3.

Examples 7-10

Production of Polyethylene Resin Particles to be Foamed

Polyethylene resin particles to be foamed were obtained in a similar manner to Reference Example 1 except for that a linear low-density polyethylene resin, a phosphorus-based antioxidant, a phenol-based antioxidant, a metal stearate, an inorganic substance, and other additive were used in composition and amounts described in Table 3.

<Production of Polyethylene Resin Foamed Particles> and <Production of Polyethylene Resin in-Mold Foam Molded Article>

Polyethylene resin foamed particles and a polyethylene resin in-mold foam molded article were obtained in a similar manner to Example 1 except for that the polyethylene resin particles to be foamed thus obtained were used. The result is shown in Table 3.

Example 11

Production of Polyethylene Resin Particles to be Foamed

Polyethylene resin particles to be foamed were obtained in a similar manner to Reference Example 1 except for that a linear low-density polyethylene resin, a phosphorus-based antioxidant, a phenol-based antioxidant, a metal stearate, and an inorganic substance were used in composition and amounts described in Table 3.

<Production of Polyethylene Resin Foamed Particles>

Into a pressure-resistant closed vessel, 100 parts by weight of the polyethylene resin particles to be foamed thus obtained were fed together with 300 parts by weight of pure water, 2 parts by weight of tertiary calcium phosphate, and 0.001 parts by weight of n-paraffin sulfonate soda. After deairing, and while stirring, 20 parts by weight of isobutane were put into the pressure-resistant closed vessel, which was then heated to 114° C. After the temperature in the pressure-resistant closed vessel reached 114° C., the internal pressure (foaming pressure) of the pressure-resistant closed vessel was set at 1.8

MPa (gage pressure) by further pressing isobutane into the pressure-resistant closed vessel, and this state was held for 10 minutes. Next, the water dispersion (foamed particles and an aqueous dispersion medium) was released into a foaming cylinder under atmospheric pressure through an orifice by opening a valve installed in the lower part of the closed vessel, thus giving foamed particles (first-stage foamed particles). During the release, the internal pressure of the pressure-resistant closed vessel was retained so as not to decrease, by additionally pressing nitrogen into the pressure-resistant closed vessel. In addition, steam was blown into the foaming cylinder so as to heat the foaming cylinder and to make contact with the foamed particles that were being released.

The first-stage foamed particles thus obtained exhibited two melting points of 118° C. and 129° C. in differential scanning calorimetry measurement, a DSC ratio of 30%, and no shoulder peak. The first-stage foamed particles were found to have Mz of $50 \times 10^4$, to have an expansion ratio of 30 times, to be excellent in uniformity of cells, to have an average cell diameter of 330 μm, and to have an open-cell ratio of 4%.

<Production of Polyethylene Resin in-Mold Foam Molded Article>

A polyethylene resin in-mold foam molded article was obtained in a similar manner to Example 1 except for that the first-stage foamed particles thus obtained were used. The result is shown in Table 3.

TABLE 3

| | | | Examples | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| | Polyethylene resin | — | A-2 | A-2 | A-2 | A-2 | A-2 | A-2 | A-1 | A-3 | A-2 | A-2 | A-2 |
| Phosphorus-based antioxidant | IRGAFOS168 | ppm | 450 | 1000 | 1000 | 1000 | 1000 | 750 | 1000 | 1000 | 1500 | 1000 | 1000 |
| Phenol-based antioxidant | IRGANOX1076 | ppm | 300 | 300 | 300 | 300 | | | 300 | 300 | 250 | 300 | 300 |
| | IRGANOX1010 | ppm | | | | | 300 | 250 | | | | | |
| | Antioxidant ratio | — | 1.5 | 3.3 | 3.3 | 3.3 | 3.3 | 3.0 | 3.3 | 3.3 | 6.0 | 3.3 | 3.3 |
| | Total amount of antioxidant | ppm | 750 | 1300 | 1300 | 1300 | 1300 | 1000 | 1300 | 1300 | 1750 | 1300 | 1300 |
| Metal stearate | calcium stearate | ppm | 400 | 400 | 400 | 400 | 400 | 400 | 400 | 400 | 400 | 400 | 400 |
| Inorganic substance | Talc | ppm | 300 | 300 | 300 | 300 | 300 | 1000 | 300 | 300 | 300 | 2000 | 300 |
| | Total amounts of antioxidant + metal stearate + inorganic substance | ppm | 1450 | 2000 | 2000 | 2000 | 2000 | 2400 | 2000 | 2000 | 2450 | 3700 | 2000 |
| Other additive | Glycerin | ppm | 2000 | 2000 | 2000 | 2000 | 2000 | 2000 | 2000 | 2000 | 2000 | 2000 | — |
| Polyethylene resin particles to be foamed | Resin particle No. | — | P-1 | P-3 | P-4 | P-5 | P-6 | P-7 | — | — | — | — | — |
| | Resin temp. during extrusion | ° C. | 210 | 210 | 290 | 290 | 290 | 290 | 210 | 210 | 210 | 210 | 210 |
| | Discharge amount during extrusion | kg/hr | 20 | 20 | 20 | 30 | 20 | 20 | 20 | 20 | 20 | 20 | 20 |
| | Mz (×10⁻⁴) | — | 50 | 50 | 50 | 50 | 50 | 50 | 41 | 69 | 50 | 50 | 50 |
| First-stage foaming conditions | carbon dioxide | part by weight | 7.5 | 7.5 | 7.5 | 7.5 | 7.5 | 7.5 | 7.5 | 7.5 | 7.5 | 7.5 | |
| | Isobutene | part by weight | | | | | | | | | | | 20 |
| | Foaming temp. | ° C. | 122 | 122 | 122 | 122 | 122 | 122 | 122 | 122 | 122 | 122 | 114 |
| | Foaming pressure (gage pressure) | MPa | 3.4 | 3.4 | 3.4 | 3.4 | 3.4 | 3.4 | 3.4 | 3.4 | 3.4 | 3.4 | 1.8 |
| First-stage foamed particles | Melting peak temp. on low-temp. side | ° C. | 117 | 117 | 117 | 117 | 117 | 117 | 117 | 116 | 117 | 117 | 118 |
| | Melting peak temp. on high-temp. side | ° C. | 128 | 128 | 128 | 128 | 128 | 128 | 128 | 128 | 128 | 128 | 129 |
| | DSC ratio | % | 30 | 30 | 30 | 30 | 30 | 30 | 28 | 31 | 30 | 30 | 30 |
| | Mz (×10⁻⁴) | — | — | — | — | — | — | — | — | — | — | — | 50 |
| | Expansion ratio | times | 11 | 11 | 11 | 11 | 11 | 9 | 10 | 9 | 11 | 12 | 30 |
| | Cell uniformity | — | Good | Good | Good | Good | Good | Good | Good | Good | Good | Good | Good |
| | Average cell diameter | μm | 130 | 120 | 120 | 120 | 120 | 110 | 130 | 110 | 110 | 100 | 330 |
| | Open-cell ratio | % | 2 | 2 | 2 | 2 | 2 | 2 | 4 | 2 | 2 | 2 | 4 |
| Second-stage foaming condition | Internal pressure (absolute pressure) of foamed particles | MPa | 0.57 | 0.57 | 0.57 | 0.57 | 0.57 | 0.57 | 0.57 | 0.57 | 0.57 | 0.57 | — |
| | Steam pressure (gage pressure) | MPa | 0.06 | 0.06 | 0.06 | 0.06 | 0.06 | 0.06 | 0.06 | 0.05 | 0.06 | 0.06 | — |

TABLE 3-continued

|  |  |  | Examples | | | | | | | | | | |
| --- | --- | --- | --- | --- | --- | --- | --- | --- | --- | --- | --- | --- | --- |
|  |  |  | 1 | 2 | 3 | 4 | 5 | 6 | 7 | 8 | 9 | 10 | 11 |
| Second-stage foamed particles | Melting peak temp. on low-temp. side | °C. | 118 | 118 | 118 | 118 | 118 | 118 | 118 | 117 | 118 | 118 | — |
|  | Melting peak temp. on high-temp. side | °C. | 128 | 128 | 128 | 128 | 128 | 128 | 128 | 128 | 128 | 128 | — |
|  | DSC ratio | % | 40 | 40 | 40 | 40 | 40 | 40 | 39 | 41 | 40 | 40 | — |
|  | Shoulder peak ratio | % | 0.3 | 0.3 | 0.3 | 0.3 | 0.3 | 0.3 | 0.3 | 0.3 | 0.3 | 0.3 | — |
|  | Mz ($\times 10^{-4}$) | — | 50 | 50 | 50 | 50 | 50 | 50 | 41 | 69 | 50 | 50 | — |
|  | Expansion ratio | times | 26 | 27 | 27 | 27 | 27 | 25 | 28 | 27 | 27 | 29 | — |
|  | Cell uniformity | — | Good | Good | Good | Good | Good | Good | Good | Good | Good | Good | — |
|  | Average cell diameter | μm | 250 | 230 | 230 | 230 | 230 | 200 | 300 | 230 | 210 | 200 | — |
|  | Open-cell ratio | % | 5 | 5 | 5 | 5 | 5 | 5 | 6 | 5 | 5 | 5 | — |
| Polyethylene resin in-mold foam molded article | Minimum foaming pressure (fusibility) | MPa | 0.11 | 0.11 | 0.11 | 0.11 | 0.11 | 0.11 | 0.11 | 0.11 | 0.11 | 0.11 | 0.11 |
|  | Yellowing | — | Average | Good | Good | Good | Good | Good | Good | Good | Good | Good | Good |
|  | Surface smoothness | — | Good | Good | Good | Good | Good | Good | Good | Good | Good | Good | Good |
|  | Density of molded article | g/L | 26 | 25 | 25 | 25 | 25 | 27 | 24 | 25 | 26 | 23 | 22 |

Comparative Examples 1 and 2

Polyethylene resin foamed particles and a polyethylene resin in-mold foam molded article were obtained in a similar manner to Example 1 except for that the polyethylene resin particles to be foamed P-2 and P-8 obtained in Reference Example (see Table 4) were used instead of the polyethylene resin particles to be foamed P-1. The result is shown in Table 4.

Comparative Examples 3 to 5

Production of Polyethylene Resin Particles to be Foamed

Polyethylene resin particles to be foamed were obtained in a similar manner to Reference Example 1 except for that a linear low-density polyethylene resin, a phosphorus-based antioxidant, a phenol-based antioxidant, a metal stearate, an inorganic substance, and other additive were used in composition and amounts described in Table 4.

<Production of Polyethylene Resin Foamed Particles> and <Production of Polyethylene Resin in-Mold Foam Molded Article>

Next, polyethylene resin foamed particles and a polyethylene resin in-mold foam molded article were obtained in a similar manner to Example 1 except for that the polyethylene resin particles to be foamed thus obtained were used. The result is shown in Table 4.

TABLE 4

|  |  |  | Comparative Examples | | | | |
| --- | --- | --- | --- | --- | --- | --- | --- |
|  |  |  | 1 | 2 | 3 | 4 | 5 |
| Polyethylene resin |  | — | A-2 | B-2 | A-2 | B-1 | A-2 |
| Phosphorus-based antioxidant | IRGAFOS168 | ppm | 450 | 1000 | 2400 | 1000 | 100 |
| Phenol-based antioxidant | IRGANOX1076<br>IRGANOX1010 | ppm<br>ppm | 300 | 300 | 300 | 300 | 300 |
| Antioxidant ratio |  | — | 1.5 | 3.3 | 8.0 | 3.3 | 0.3 |
| Total amount of antioxidant |  | ppm | 750 | 1300 | 2700 | 1300 | 400 |
| Metal stearate | calcium stearate | ppm | 400 | 400 | 400 | 400 | 400 |
| Inorganic substance | Talc | ppm | 300 | 300 | 1000 | 300 | 100 |
| Total amounts of antioxidant + metalstearate + inorganic substance |  | ppm | 1450 | 2000 | 4100 | 2000 | 900 |
| Other additive | Glycerin | ppm | 2000 | 2000 | 2000 | 2000 | 2000 |
| Polyethylene resin particles to be foamed | Resin particle No. | — | P-2 | P-8 | — | — | — |
|  | Resin temperature during extrusion | °C. | 290 | 210 | 210 | 210 | 210 |
|  | Discharge amount during extrusion | kg/hr | 20 | 20 | 20 | 20 | 20 |
|  | Mz ($\times 10^{-4}$) | — | 51 | 78 | 50 | 36 | 50 |

TABLE 4-continued

| | | | Comparative Examples | | | | |
|---|---|---|---|---|---|---|---|
| | | | 1 | 2 | 3 | 4 | 5 |
| First-stage foaming conditions | carbon dioxide | parts by weight | 7.5 | 7.5 | 7.5 | 7.5 | 7.5 |
| | Foaming temperature | °C. | 122 | 122 | 122 | 122 | 122 |
| | Foaming pressure (gage pressure) | MPa | 3.4 | 3.4 | 3.4 | 3.4 | 3.4 |
| First-stage foamed particles | Melting peak temp. on low-temp. side | °C. | 117 | 117 | 117 | 117 | 117 |
| | Melting peak temp. on high-temp. side | °C. | 128 | 128 | 128 | 128 | 128 |
| | DSC ratio | % | 30 | 30 | 30 | 28 | 28 |
| | Expansion ratio | times | 7 | 6 | 12 | 7 | 6 |
| | Cell uniformity | — | Good | Good | Good | Good | Poor |
| | Average cell diameter | μm | 80 | 90 | 80 | 150 | 140 |
| | Open-cell ratio | % | 2 | 2 | 2 | 15 | 2 |
| Second-stage foaming condition | Internal pressure (absolute pressure) of foamed particles | MPa | 0.57 | 0.57 | 0.57 | 0.57 | 0.57 |
| | Steam pressure (gage pressure) | MPa | 0.06 | 0.06 | 0.06 | 0.06 | 0.06 |
| Second-stage foamed particles | Melting peak temp. on low-temp. side | °C. | 118 | 118 | 118 | 118 | 118 |
| | Melting peak temp. on high-temp. side | °C. | 128 | 128 | 128 | 128 | 128 |
| | DSC ratio | % | 40 | 40 | 40 | 39 | 39 |
| | Shoulder peak ratio | % | 0.3 | 0.3 | 0.3 | 0.3 | 0.3 |
| | Mz (×10$^{-4}$) | — | 51 | 78 | 50 | 36 | 50 |
| | Expansion ratio | times | 14 | 18 | 27 | 21 | 19 |
| | Cell uniformity | — | Good | Good | Good | Good | Poor |
| | Average cell diameter | μm | 140 | 170 | 150 | 270 | 290 |
| | Open-cell ratio | % | 5 | 5 | 5 | 20 | 5 |
| Polyethylene resin in-mold foam molded article | Minimum foaming pressure (fusibility) | MPa | 0.11 | 0.12 | 0.11 | 0.11 | 0.11 |
| | Yellowing | — | Average | Good | Good | Good | Poor |
| | Surface smoothness | — | Poor | Poor | Average | Very poor | Poor |
| | Density of molded article | g/L | 49 | 40 | 25 | 32 | 38 |

A comparison between Examples 2, 7, and 8 and Comparative Example 2 shows that, according to the present invention, in a case where Mz of the polyethylene resin foamed particles is in a range from not less than 40×10⁴ to not more than 70×10⁴, it is possible to obtain, even in a case where a total amount of antioxidant, metal stearate, and inorganic substance is 2000 ppm, foamed particles which have a large average cell diameter and a polyethylene resin in-mold foam molded article which is not reduced in surface smoothness. This comparison also shows that in a case where Mz of the polyethylene resin foamed particles is more than 70×10⁴, (i) the antioxidant, the metal stearate, and the inorganic substance remarkably act as foam nucleating agents, and thus cause a reduction in average cell diameter and a decline in expansion ratio, and (ii) the polyethylene resin in-mold foam molded article has a less smooth surface (more noticeable wrinkles and dents between particles).

A comparison between Examples 2, 7, and 8 and Comparative Example 4 shows that in a case where Mz of the polyethylene resin foamed particles is less than 40×10⁴, the open-cell ratio of the polyethylene resin foamed particles increases and a polyethylene resin in-mold foam molded article to be obtained has a less smooth surface. It is hypothesized that this is because such a large open-cell ratio causes shrinkage of the polyethylene resin in-mold foam molded article, and thus causes a deterioration in surface smoothness.

A comparison between Example 10 and Comparative Example 3 shows that, in a case where the total amount of antioxidant, metal stearate, and inorganic substance is more than 4000 ppm, there occurs a reduction in average cell diameter even in a case where Mz of the polyethylene resin foamed particles is 50×10⁴, and therefore the polyethylene resin in-mold foam molded article has a less smooth surface.

A comparison between Example 2 and Examples 3 and 4 or a comparison between Example 3 and Comparative Example 1 shows that, according to the present invention, even in a case where polyethylene resin particles to be foamed are obtained at a high resin temperature of 290° C., it is possible to obtain good polyethylene resin foamed particles and a good polyethylene resin in-mold foam molded article that are free from resin degradation. It is estimated that, in Comparative Example 1, the average cell diameter and the expansion ratio were not high because the amount of antioxidant was small and there occurred harsh resin degradation.

A comparison between Example 1 and Example 2 shows that, in a case where the amount of the phosphorus-based antioxidant is less than 500 ppm or in a case where the antioxidant ratio is less than 2, it was impossible to sufficiently suppress surface yellowing of a polyethylene resin in-mold foam molded article.

A comparison between Example 5 and Example 6 shows that, in a case where polyethylene resin particles to be foamed are obtained at a high resin temperature of 290° C., there occur, in a case where the total amount of the phosphorus-based antioxidant and the phenol-based antioxidant is less than 1100 ppm, (i) slight resin degradation and (ii) a slight decline in expansion ratio of polyethylene resin foamed particles.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

According to the polyethylene resin foamed particles of the present invention, it is possible to produce an effect of providing polyethylene resin foamed particles that (i) are obtained by foaming polyethylene resin particles to be foamed that have good productivity and can be foamed at a high expansion ratio, and (ii) are suppressed in reduction of cell diameters and in resin degradation.

According to the method of the present invention for producing polyethylene resin foamed particles, it is possible to produce an effect of producing polyethylene resin foamed particles that are suppressed in reduction of cell diameters and in resin degradation.

The polyethylene resin foamed particles of the present invention can therefore be used in wide variety of industrial fields as polyethylene resin foamed particles for use as a buffering material, a buffering package, a returnable box, a heat insulating material, and the like.

The invention claimed is:

1. Polyethylene resin foamed particles comprising, as a base resin, a polyethylene resin composition which contains, in an amount of not less than 1000 ppm to not more than 4000 ppm in total, compounds selected from the group consisting of antioxidant, metal stearate, and inorganic substance,
the polyethylene resin foamed particles having a Z-average molecular weight of not less than $40 \times 10^4$ to not more than $70 \times 10^4$, an average cell diameter of not less than 180 μm to not more than 450 μm, and an open-cell ratio of not more than 12%,
wherein the antioxidant includes a phosphorus-based antioxidant and a phenol-based antioxidant, an amount of the phosphorus-based antioxidant contained in the polyethylene resin composition is not less than 500 ppm to not more than 1500 ppm, and a ratio of the amount of the phosphorus-based antioxidant to an amount of the phenol-based antioxidant in the polyethylene resin composition (the amount of the phosphorus-based antioxidant/the amount of the phenol-based antioxidant) is not less than 2.0 to not more than 7.5, and
wherein the inorganic substance is in an amount of not less than 300 ppm to not more than 2500 ppm.

2. The polyethylene resin foamed particles according to claim 1, wherein the Z-average molecular weight is not less than $45 \times 10^4$ to not more than $60 \times 10^4$.

3. The polyethylene resin foamed particles according to claim 1, wherein the polyethylene resin composition contains the compounds in an amount of not less than 1600 ppm to not more than 3700 ppm in total.

4. The polyethylene resin foamed particles according to claim 1, wherein the ratio is not less than 2.5 to not more than 5.0.

5. The polyethylene resin foamed particles according to claim 1, wherein a total amount of the phosphorus-based antioxidant and the phenol-based antioxidant contained in the polyethylene resin composition is not less than 800 ppm to not more than 1900 ppm in total.

6. The polyethylene resin foamed particles according to claim 1, wherein the polyethylene resin composition contains the metal stearate in an amount of not less than 200 ppm to not more than 700 ppm.

7. The polyethylene resin foamed particles according to claim 1, wherein the average cell diameter is not less than 200 μm to not more than 400 μm.

8. The polyethylene resin foamed particles according to claim 1, wherein a polyethylene resin in the polyethylene resin composition contains at least a linear low-density polyethylene resin.

9. A polyethylene resin in-mold foam molded article produced by in-mold foam molding of polyethylene resin foamed particles as set forth in claim 1.

10. A method for producing polyethylene resin foamed particles which have a Z-average molecular weight of not less than $40 \times 10^4$ to not more than $70 \times 10^4$, an average cell diameter of not less than 180 μm to not more than 450 μm, and an open-cell ratio of not more than 12%, the method comprising a first-stage foaming step of:
(i) dispersing polyethylene resin particles to be foamed in an aqueous dispersion medium in a closed vessel together with a foaming agent, the polyethylene resin particles to be foamed including a polyethylene resin composition which contains, in an amount of not less than 1000 ppm to not more than 4000 ppm in total, compounds selected from the group consisting of antioxidant, metal stearate, and inorganic substance;
(ii) pressurizing and heating up to or above a softening temperature of the polyethylene resin particles to be foamed; and
(iii) releasing the polyethylene resin particles to be foamed into a zone whose pressure is lower than an internal pressure of the closed vessel,
wherein the antioxidant includes a phosphorus-based antioxidant and a phenol-based antioxidant, an amount of the phosphorus-based antioxidant contained in the polyethylene resin composition is not less than 500 ppm to not more than 1500 ppm, and a ratio of the amount of the phosphorus-based antioxidant to an amount of the phenol-based antioxidant in the polyethylene resin composition (the amount of the phosphorus-based antioxidant/the amount of the phenol-based antioxidant) is not less than 2.0 to not more than 7.5, and
wherein the inorganic substance is in an amount of not less than 300 ppm to not more than 2500 ppm.

11. A method for producing polyethylene resin foamed particles which have a Z-average molecular weight of not less than $40 \times 10^4$ to not more than $70 \times 10^4$, an average cell diam eter of not less than 180 μm to not more than 450 μm, and an open-cell ratio of not more than 12%, the method comprising:

(A) a first-stage foaming step of:
  (i) dispersing polyethylene resin particles to be foamed in an aqueous dispersion medium in a closed vessel together with carbon dioxide, the polyethylene resin particles to be foamed including a polyethylene resin composition which contains, in an amount of not less than 1000 ppm to not more than 4000 ppm in total, compounds selected from the group consisting of antioxidant, metal stearate, and inorganic substance,
  (ii) pressurizing and heating up to or above a softening temperature of the polyethylene resin particles to be foamed, and
  (iii) releasing the polyethylene resin particles to be foamed into a zone whose pressure is lower than an internal pressure of the closed vessel so as to obtain polyethylene resin foamed particles; and (B) a second-stage foaming step of:
  (i) putting the polyethylene resin foamed particles obtained in the first-stage foaming step into a pressure-resistant vessel,
  (ii) impregnating the polyethylene resin foamed particles with an inorganic gas containing at least one type of gas selected from the group consisting of air, nitrogen, and carbon dioxide to impart an internal pressure to the polyethylene resin foamed particles, and
  (iii) further foaming the polyethylene resin foamed particles through heating, wherein the antioxidant includes a phosphorus-based antioxidant and a phenol-based antioxidant, an amount of the phosphorus-based antioxidant contained in the polyethylene resin composition is not less than 500 ppm to not more than 1500 ppm, and a ratio of the amount of the phosphorus-based antioxidant to an amount of the phenol-based antioxidant in the polyethylene resin composition (the amount of the phosphorus-based antioxidant/the amount of the phenol-based antioxidant) is not less than 2.0 to not more than 7.5, and wherein the inorganic substance is in an amount of not less than 300 ppm to not more than 2500 ppm.

12. The method according to claim 10, wherein the polyethylene resin particles to be foamed are obtained through melting and kneading in an extruder at a resin temperature ranging from not less than 250° C. to not more than 320° C.

13. The method according to claim 11, wherein the polyethylene resin particles to be foamed are obtained through melting and kneading in an extruder at a resin temperature ranging from not less than 250° C. to not more than 320° C.

* * * * *